(12) United States Patent
Chiu et al.

(10) Patent No.: US 10,407,113 B2
(45) Date of Patent: Sep. 10, 2019

(54) LED DRIVER

(71) Applicant: SEMICONDUCTOR COMPONENTS INDUSTRIES, LLC, Phoenix, AZ (US)

(72) Inventors: Chen-Hua Chiu, New Taipei (TW); Moon-Ho Choi, Seoul (KR); Gwan-Bon Koo, Gyeonggi-Do (KR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 34 days.

(21) Appl. No.: 15/350,385

(22) Filed: Nov. 14, 2016

(65) Prior Publication Data

US 2017/0142798 A1    May 18, 2017

Related U.S. Application Data

(60) Provisional application No. 62/254,267, filed on Nov. 12, 2015.

(51) Int. Cl.
    *H05B 33/08*   (2006.01)
    *B62D 55/104*  (2006.01)
    *B62D 55/10*   (2006.01)
    *B62D 55/112*  (2006.01)
    *B62D 55/14*   (2006.01)

(52) U.S. Cl.
    CPC ........... *B62D 55/104* (2013.01); *B62D 55/10* (2013.01); *B62D 55/112* (2013.01); *B62D 55/14* (2013.01); *H05B 33/083* (2013.01)

(58) Field of Classification Search
    CPC . H05B 1/0272; H05B 37/0218; H05B 33/083
    USPC .................................... 315/185 R, 186–192
    See application file for complete search history.

(56) References Cited

U.S. PATENT DOCUMENTS

| | | | |
|---|---|---|---|
| 2008/0054815 A1* | 3/2008 | Kotikalapoodi ... | H05B 33/0815 315/192 |
| 2010/0134040 A1* | 6/2010 | Elder ................. | H05B 33/0815 315/294 |
| 2010/0164403 A1* | 7/2010 | Liu ...................... | H05B 33/086 315/297 |
| 2011/0025216 A1 | 2/2011 | Ching-Chi et al. | |
| 2011/0084619 A1* | 4/2011 | Gray ................. | H05B 33/0824 315/185 R |
| 2014/0132172 A1 | 5/2014 | Zhu et al. | |

(Continued)

FOREIGN PATENT DOCUMENTS

| | | |
|---|---|---|
| CN | 104066254 A | 9/2014 |
| TW | M368010 U1 | 11/2009 |

(Continued)

*Primary Examiner* — Dedei K Hammond
*Assistant Examiner* — Amy X Yang
(74) *Attorney, Agent, or Firm* — Robert F. Hightower

(57) ABSTRACT

An LED driver is provided. The LED driver comprises a plurality of driving units and a fold circuit. The driving units are coupled to an LED string including a plurality of LEDs for driving the LEDs. The fold circuit is coupled to the LED string and divides the LED string into a plurality of LED segments when an input voltage is lower than a threshold voltage. The LED segments are coupled to each other in parallel, and the input voltage is supplied to the LED segments.

18 Claims, 17 Drawing Sheets

(56) References Cited

U.S. PATENT DOCUMENTS

| | | | | |
|---|---|---|---|---|
| 2015/0163869 A1* | 6/2015 | Yu | .................... | H05B 33/0806 |
| | | | | 315/191 |
| 2016/0007420 A1* | 1/2016 | Gong | ................ | H05B 33/0815 |
| | | | | 315/187 |
| 2016/0050730 A1* | 2/2016 | Kim | .................. | H05B 33/0812 |
| | | | | 315/191 |

FOREIGN PATENT DOCUMENTS

| | | |
|---|---|---|
| TW | I415521 B | 11/2013 |
| TW | I434616 B | 4/2014 |
| TW | I441556 B | 6/2014 |
| TW | 201622484 A | 6/2016 |
| TW | 201630468 A | 8/2016 |
| TW | I549564 B | 9/2016 |

* cited by examiner

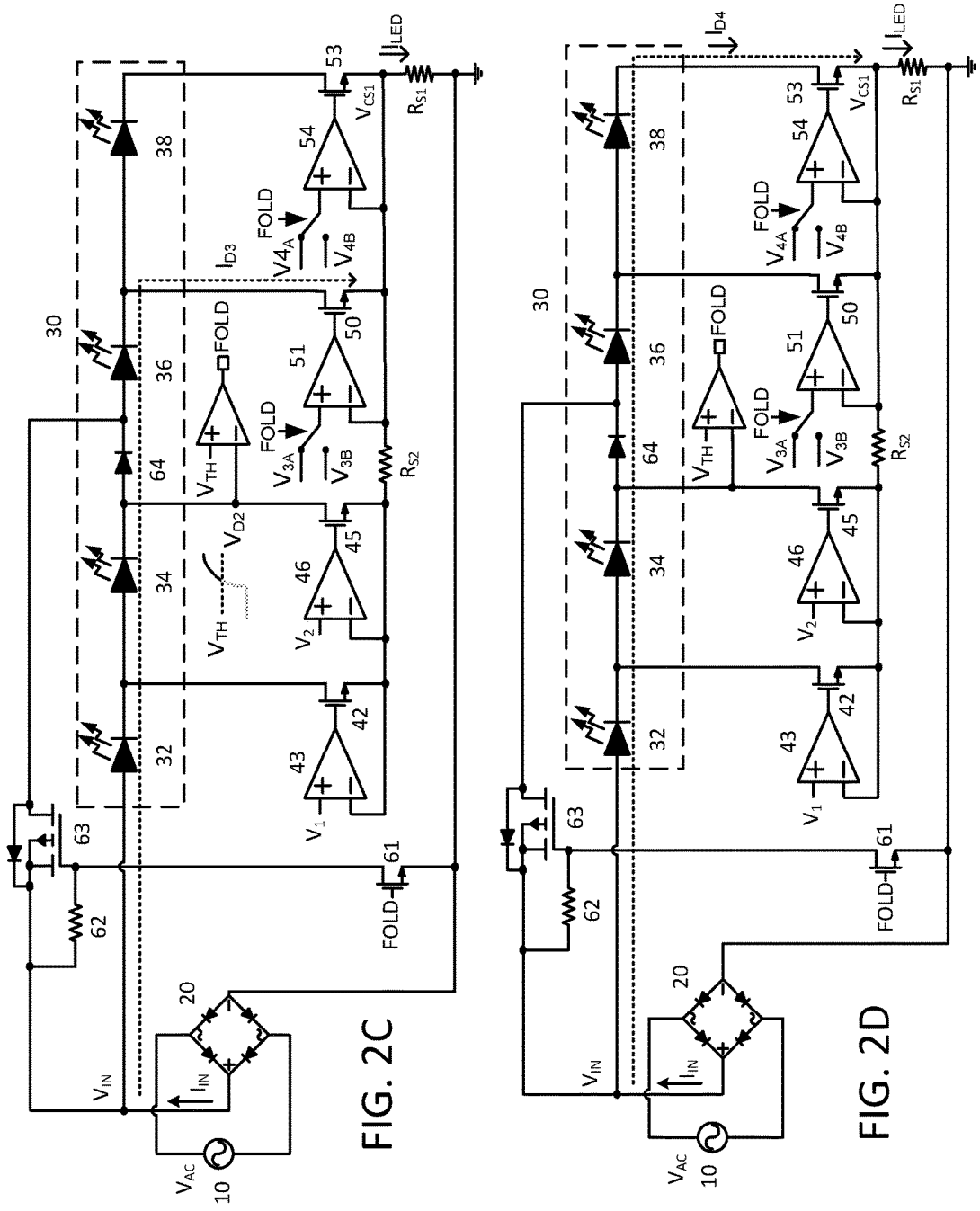

LED DRIVER

REFERENCE TO RELATED APPLICATION

This application is based on Provisional Patent Application Ser. No. 62/254,267, filed 12 Nov. 2015, currently pending.

BACKGROUND OF THE INVENTION

Field of Invention

The present invention relates to LED, and more specifically relates to an LED driver.

Description of the Related Art

The LED (Light-Emitting Diode) lamps are widely used in a variety of electronic applications due to LED lamps have significant advantages, such as long life time, small size, and high efficiency. In general, the LED lamp includes a plurality of LEDs, and the LEDs are connected to each other in series as an LED string. The LED string is driven by the rectified AC (Alternating Current) voltage. The voltage level of the rectified AC voltage always changes with respect to time. Therefore, the voltage level of the rectified AC voltage isn't always higher than the summation of the forward voltages of all LEDs, therefore some LEDs aren't luminous. Therefore, the utilization rate of the LEDs is weak.

In addition, most LED systems comprise a dimmer, such as TRIAC dimmer, which is used to adjust the brightness of the LED lamps. The TRIAC dimmer is triggered every half of AC cycle. While it is trigged, the current flowing through it should be kept higher than a threshold current for the remaining half AC cycle. The threshold current is called holding current.

Accordingly, the present invention provides an LED driver for increasing the utilization rate of LEDs of the LED string when the input voltage is lower and sinking a bleeding current in order to keep the current flowing through the dimmer higher than the holding current.

BRIEF SUMMARY OF THE INVENTION

The objective of the present invention is to provide an LED driver, that divides the LED string into LED segments and couples the LED segments in parallel for increasing the utilization rate of LEDs of the LED string when the input voltage is lower.

The objective of the present invention is to provide an LED driver, that sinks a bleeding current according to a current-sense signal correlated to a total LED current for keeping the current flowing through the dimmer higher than the holding current.

An LED driver according to the present invention comprises a plurality of driving units and a fold circuit. The driving units are coupled to an LED string including a plurality of LEDs for driving the LEDs. The fold circuit is coupled to the LED string and divides the LED string into a plurality of LED segments when an input voltage is lower than a threshold voltage. The LED segments are coupled to each other in parallel, and the input voltage is supplied to the LED segments.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

FIGS. 2A~2D show operation modes of the first embodiment of the LED system according to the present invention.

DETAILED DESCRIPTION OF EMBODIMENTS

Figure 1A:
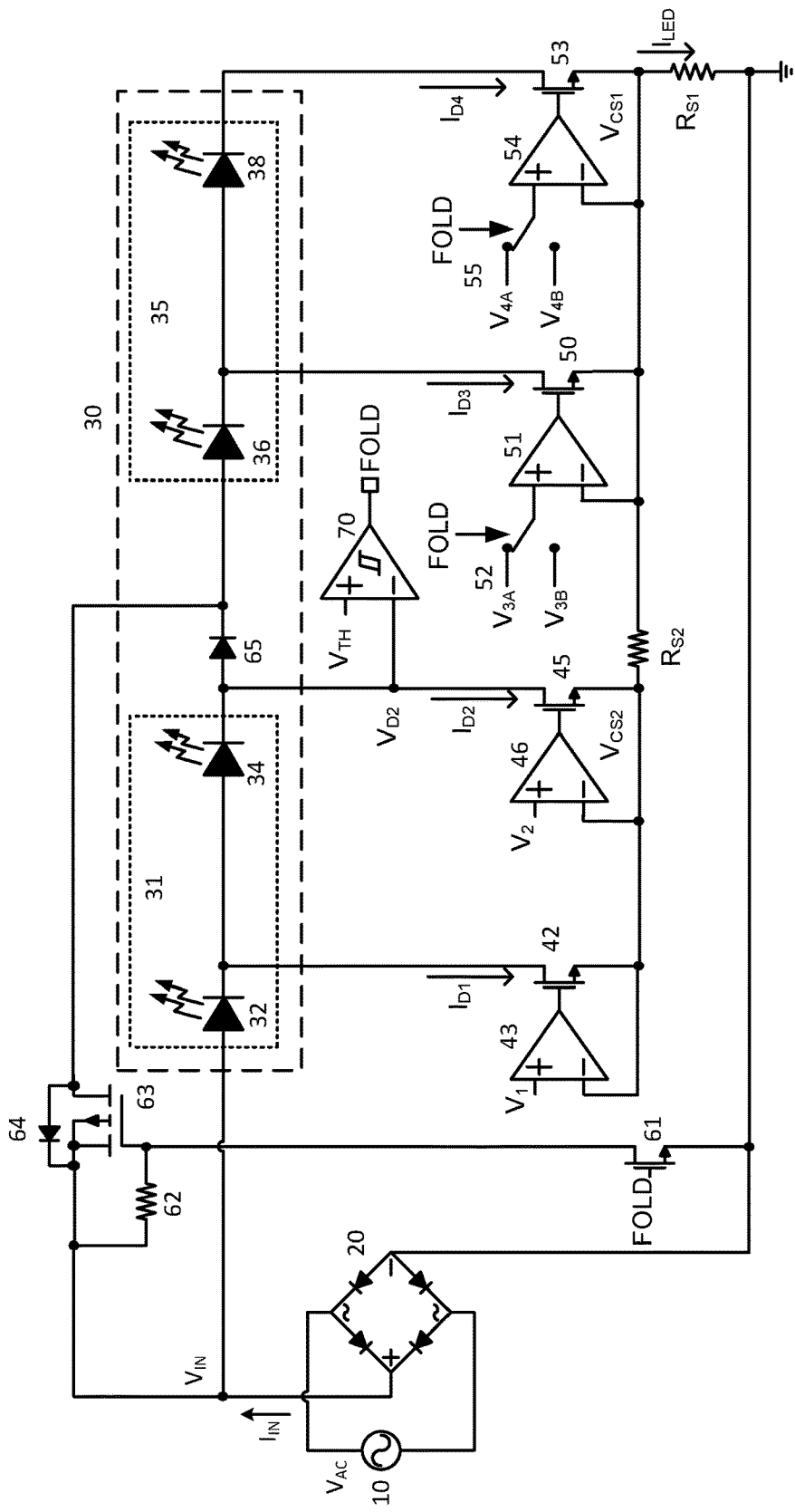
FIG. 1A shows a circuit diagram of the first embodiment of the LED driver applied to the LED system according to the present invention.

FIG. 1A shows a circuit diagram of the first embodiment of the LED driver applied to the LED system according to the present invention. As shown in FIG. 1A, the LED system comprises an AC power source 10, a bridge rectifier 20, an LED string 30, a plurality of driving units, and a fold circuit. The LED string 30 comprises a plurality of LEDs 32, 34, 36, and 38 coupled each other in series. The fold circuit comprises a control transistor 61, a resistor 62, a switch 63, and a diode 65. Each of the driving units comprises a transistor and an operational amplifier. The driving units are operated as the current regulators. According to this embodiment, the LED driver comprises four driving units corresponding to LEDs 32, 34, 36, and 38, respectively.

The first driving unit comprises a first transistor 42 and a first operational amplifier 43. The second driving unit comprises a second transistor 45 and a second operational amplifier 46. The third driving unit comprises a third transistor 50, a third operational amplifier 51, and a switch 52. The fourth driving unit comprises a fourth transistor 53, a fourth operational amplifier 54, and a switch 55. The first terminals (drain terminals) of the transistors 42, 45, 50, and 53 are coupled to the cathodes of the LEDs 32, 34, 36, and 38, respectively. The second terminals (source terminals) of the transistors 42 and 45 are coupled to the first terminal of a second current-sense element $R_{S2}$. The second terminal of the second current-sense element $R_{S2}$ is coupled to the first terminal of a first current-sense element $R_{S1}$, and the second terminal of the first current-sense element $R_{S1}$ is coupled to the ground. Therefore, the transistors 42 and 45 are coupled to the ground through the current-sense elements $R_{S1}$ and $R_{S2}$. That is, the transistors 42 and 45 are coupled between the LEDs 32, 34 and the ground, respectively. The first current-sense element $R_{S1}$ senses the total LED current $I_{LED}$ for generating a first current-sense signal $V_{CS1}$. The second current-sense element $R_{S2}$ senses the first LED current $I_{D1}$ and the second LED current $I_{D2}$ for generating a second current-sense signal $V_{CS2}$.

The negative input terminals of the operational amplifiers 43 and 46 are also coupled to the first terminal of the second current-sense element $R_{S2}$ to receive the second current-sense signal $V_{CS2}$. A first reference signal $V_1$ is supplied to the positive input terminal of the first operational amplifier 43. The output terminal of the first operational amplifier 43 is coupled to the gate terminal of the first transistor 42. The first operational amplifier 43 controls the first transistor 42 to regulate the first LED current $I_{D1}$ for driving the first LED 32 in response to the second current-sense signal $V_{CS2}$ and the first reference signal $V_1$. A second reference signal $V_2$ is supplied to the positive input terminal of the second operational amplifier 46. The output terminal of the second operational amplifier 46 is coupled to the gate terminal of the second transistor 45. The second operational amplifier 46 controls the second transistor 45 to regulate the second LED current $I_{D2}$ for driving the LEDs 32 and 34 in response to the second current-sense signal $V_{CS2}$ and the second reference signal $V_2$.

The negative input terminals of the operational amplifiers 51 and 54 are coupled to the second terminal of the second current-sense element $R_{S2}$ and the first terminal of the first current-sense element $R_{S1}$ to receive the first current-sense signal $V_{CS1}$. The first terminal of the switch 52 is coupled to the positive input terminal of the third operational amplifier 51. A reference signal $V_{3A}$ is supplied to the second terminal of the switch 52, and a reference signal $V_{3B}$ is supplied to the third terminal of the switch 52. The reference signal $V_{3A}$ or $V_{3B}$ is supplied to the positive input terminal of the third operational amplifier 51 through the switch 52 as the third reference signal. The switch 52 is controlled by a fold signal FOLD. The output terminal of the third operational amplifier 51 is coupled to the gate terminal of the third transistor 50. The third operational amplifier 51 controls the third transistor 50 to regulate the third LED current $I_{D3}$ for driving the third LED 36 in response to the first current-sense signal $V_{CS1}$ and the reference signal $V_{3A}$ or $V_{3B}$.

The first terminal of the switch 55 is coupled to the positive input terminal of the fourth operational amplifier 54. A reference signal $V_{4A}$ is supplied to the second terminal of the switch 55, and a reference signal $V_{4B}$ is supplied to the third terminal of the switch 55. The reference signal $V_{4A}$ or $V_{4B}$ is supplied to the positive input terminal of the fourth operational amplifier 54 through the switch 55 as the fourth reference signal. The switch 55 is also controlled by the fold signal FOLD. The output terminal of the fourth operational amplifier 54 is coupled to the gate terminal of the fourth transistor 53. The fourth operational amplifier 54 controls the fourth transistor 53 to regulate the fourth LED current $I_{D4}$ for driving the fourth LED 38 in response to the first current-sense signal $V_{CS1}$ and the reference signal $V_{4A}$ or $V_{4B}$.

Figure 1B:
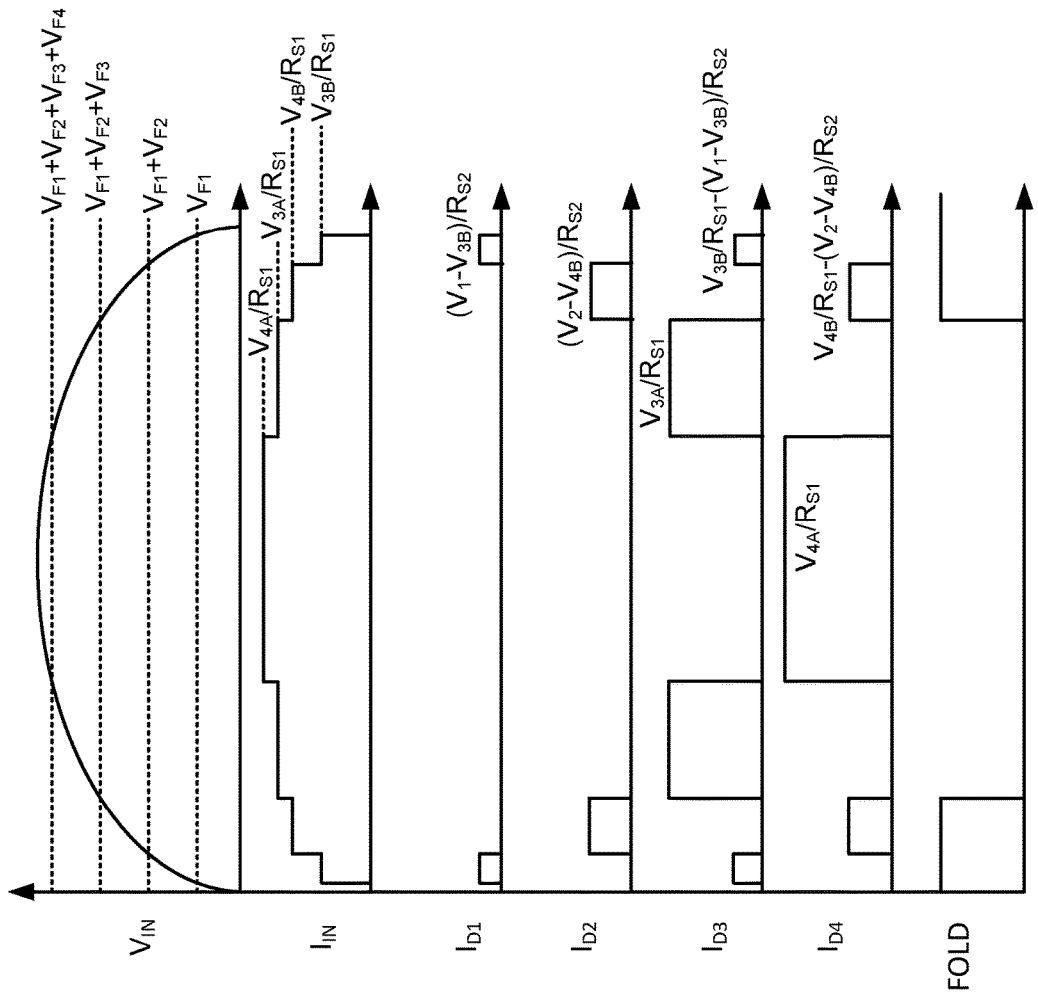
FIG. 1B shows waveforms of the first embodiment of the LED system according to the present invention.

The AC power source 10 supplies an AC power $V_{AC}$ to the bridge rectifier 20. The bridge rectifier 20 rectifies the AC power $V_{AC}$ for providing an input power to the LED string 30. The input power supplies an input voltage $V_{IN}$ and an input current $I_{IN}$. The input voltage $V_{IN}$ is the rectified AC voltage (as shown in FIG. 1B). The input current $I_{IN}$ provides the LED current for driving the LEDs 32, 34, 36, and 38. The LED string 30 is driven directly by the rectified AC voltage (input voltage $V_{IN}$) according to the present invention.

The fold circuit comprising the control transistor 61, the resistor 62, the switch 63, and the diode 65 is coupled to the LED string 30 for dividing the LED string 30 into a plurality of LED segments 31 and 35 when the input voltage $V_{IN}$ is lower than a threshold voltage. The LED segments 31 and 35 are coupled to each other in parallel, and the input voltage $V_{IN}$ is supplied to the LED segments 31 and 35 for driving the LEDs 32, 34, 36, and 38 when the input voltage $V_{IN}$ is lower than the threshold voltage.

The switch 63 may be implemented by the transistor according to one embodiment of the present invention. A diode 64 is coupled to the switch 63 in parallel. The first terminal (source terminal) of the switch 63 is coupled to the bridge rectifier 20 to receive the input power. The second terminal (drain terminal) of the switch 63 is coupled to the dividing point of the LED string 30. The dividing point of the LED string 30 may be the middle of the LED string 30 according to one embodiment of the present invention. The control transistor 61 is coupled between the control terminal (gate terminal) of the switch 63 and the ground. The control transistor 61 is controlled by the fold signal FOLD. The fold signal is generated (enabled) when the input voltage $V_{IN}$ is lower than the threshold voltage. Therefore, the control transistor 61 turns on the switch 63 for dividing the LED string 30 into the LED segments 31 and 35 when the input voltage $V_{IN}$ is lower than the threshold voltage. Accordingly, the control transistor 61 is operated as a control circuit for controlling the switch 63 according to this embodiment. Further, the resistor 62 is coupled between the first terminal (drain terminal) of the control transistor 61 and the input power. The diode 65 is set at the dividing point of the LED string 30 and coupled between the LEDs 34 and 36.

A detection circuit comprises a comparator 70 for detecting the input voltage $V_{IN}$ and generating the fold signal FOLD when the input voltage $V_{IN}$ is lower than the threshold voltage. The comparator 70 is coupled to middle of the LED string 30 for detecting the input voltage $V_{IN}$ according one embodiment of the present invention. The negative input terminal of the comparator 70 is coupled to the cathode of the LED 34 to detect the voltage $V_{D2}$ at the cathode of the LED 34 for detecting the input voltage $V_{IN}$ due to the voltage $V_{D2}$ is correlated to the input voltage $V_{IN}$. The threshold voltage $V_{TH}$ is supplied to the positive input terminal of the comparator 70.

Figure 2A:
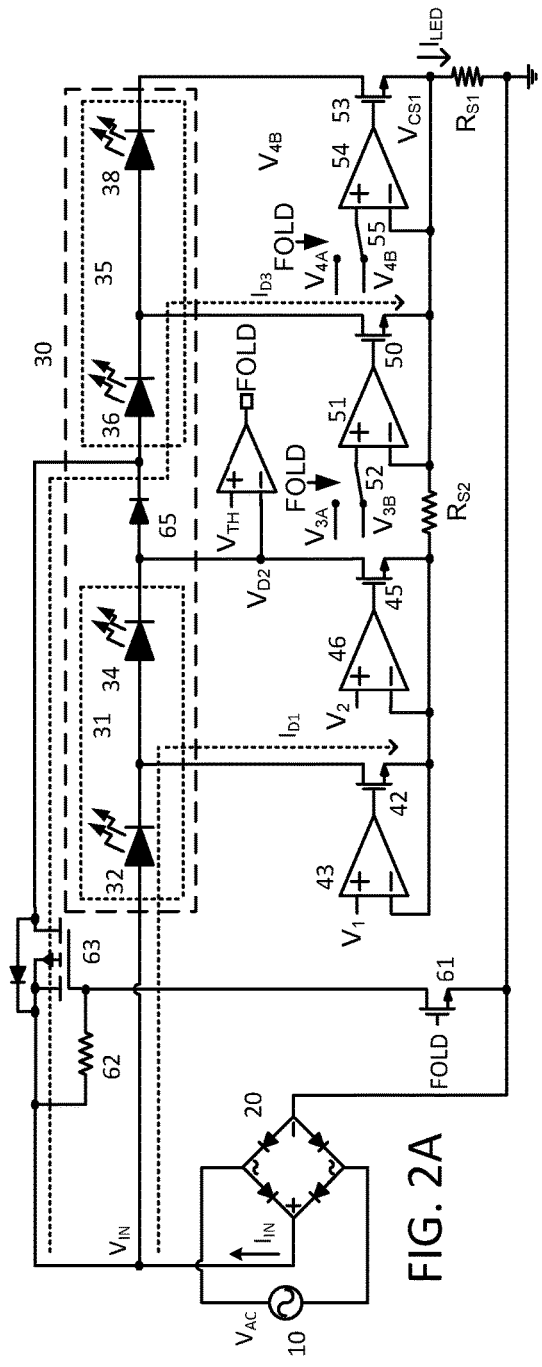

FIG. 1B shows waveforms of the first embodiment of the LED system according to the present invention. FIGS. 2A~2D show operation modes of the first embodiment of the LED system according to the present invention. As shown in FIG. 1B, the input voltage $V_{IN}$ is shown with respect to the forward voltages $V_{F1}$, $V_{F2}$, $V_{F3}$, and $V_{F4}$ of LEDs 32, 34, 36, and 38, respectively. The forward voltage $V_{F1}$ is equal to forward voltage $V_{F3}$, and forward voltage $V_{F2}$ is equal to forward voltage $V_{F4}$. As shown in FIGS. 1B and 2A, the fold signal FOLD is enabled because the input voltage $V_{IN}$ is higher than the forward voltage $V_{F1}$, but the input voltage $V_{IN}$ is lower than the summation of the forward voltages $V_{F1}$ and $V_{F2}$ ($V_{F1} < V_{IN} < V_{F1} + V_{F2}$). That is, the voltage $V_{D2}$ (input voltage $V_{IN}$) is lower than the threshold voltage $V_{TH}$. In this embodiment, the threshold voltage $V_{TH}$ is higher than or equal to the summation of the forward voltages $V_{F1}$, $V_{F2}$, and $V_{F3}$ of the LEDs 32, 34, and 36.

When the fold signal FOLD is enabled, the control transistor 61 is turned on to pull low the gate voltage of the transistor (switch) 63 for turning on the transistor, therefore the LED string 30 is divided into the first LED segment 31 upstream to the dividing point of the LED string 30 and the second LED segment 35 downstream to the dividing point. Further, the terminal of the second LED segment 35, that is the dividing point and the anode of the third LED 36, is coupled to the input voltage $V_{IN}$. In other words, the LED segments 31 and 35 are coupled to each other in parallel, that the LED string 30 likes to be folded. Further, the switches 52 and 55 are switched for supplying the reference signal $V_{3B}$ and $V_{4B}$ to the operational amplifiers 51 and 54, respectively.

The reference signal $V_{4B}$ is higher than the reference signal $V_{3B}$. Further, the reference signal $V_2$ is higher than the reference signal $V_1$. The reference signal $V_1$ is higher than the reference signal $V_{3B}$, and the reference signal $V_2$ is higher than the reference signal $V_{4B}$. Therefore, the reference signal of any driving unit of each LED segment is higher than or equal to the reference signal of the previous driving unit of the same LED segment. The reference signal of the Nth driving unit (the first driving unit or the second driving unit) corresponding to the Nth LED (the first LED 36 or the second LED 38) of the second LED segment 35 is lower than the reference signal of the Nth driving unit (the first driving unit or the second driving unit) corresponding to the Nth LED (the first LED 32 or the second LED 34) of the first LED segment 31.

Accordingly, the LEDs 32 and 36 are driven by the input voltage $V_{IN}$ due to the input voltage $V_{IN}$ is higher than the forward voltages $V_{F1}$ and $V_{F3}$. The LED currents $I_{D1}$ and $I_{D3}$ flow through the LEDs 32 and 36, respectively. The second current-sense element $R_{S2}$ senses the LED current $I_{D1}$ (first LED segment current) flowing through the first LED segment 31 for generating the second current-sense signal $V_{CS2}$. The first current-sense element $R_{S1}$ senses the total LED current $I_{LED}$ of the LED current $I_{D1}$ (first LED segment current) and the LED current $I_{D3}$ (second LED segment current) flowing through the second LED segment 35 for generating the first current-sense signal $V_{CS1}$. The LED currents $I_{D1}$ and $I_{D3}$ and the input current $I_{IN}$ can be expressed as:

$$I_{D1} = \frac{V_1 - V_{3B}}{R_{S2}} \quad (1)$$

$$I_{D3} = \frac{V_{3B}}{R_{S1}} - \frac{V_1 - V_{3B}}{R_{S2}} \quad (2)$$

$$I_{IN} = \frac{V_{3B}}{R_{S1}} \quad (3)$$

Figure 2B:
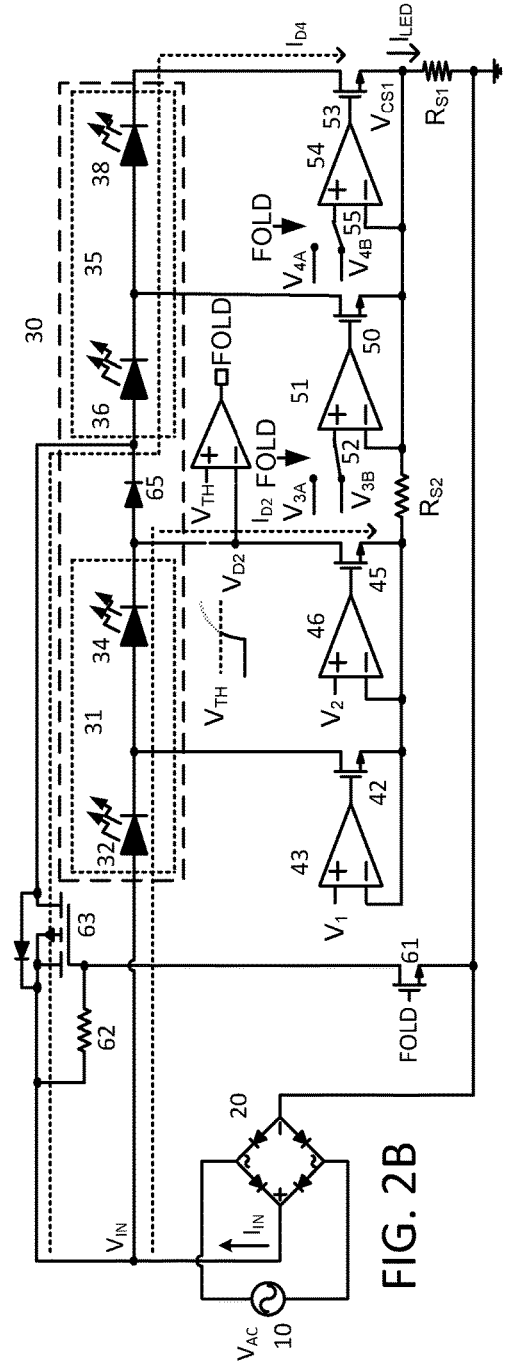

As shown in FIGS. 1B and 2B, the fold signal FOLD is also enabled because the input voltage $V_{IN}$ is higher than the summation of the forward voltages $V_{F1}$ and $V_{F2}$, but the input voltage $V_{IN}$ is lower than the summation of the forward voltages $V_{F1}$, $V_{F2}$, and $V_{F3}$ ($V_{F1}+V_{F2}<V_{IN}<V_{F1}+V_{F2}+V_{F3}$). That is, the input voltage $V_{IN}$ is lower than the threshold voltage. Therefore, the LED string 30 is kept to be divided into LED segments 31 and 35 coupled to each other in parallel. The LEDs 32, 34, 36, and 38 are driven by the input voltage $V_{IN}$ due to the input voltage $V_{IN}$ is higher than the summation of the forward voltages $V_{F1}$ and $V_{F2}$ and also higher than the summation of the forward voltages $V_{F3}$ and $V_{F4}$. The LED current $I_{D2}$ flows through the LEDs 32 and 34. The LED current $I_{D4}$ flows through the LEDs 36 and 38. The second current-sense element $R_{S2}$ senses the LED current $I_{D2}$ (first LED segment current) flowing through the first LED segment 31 for generating the second current-sense signal $V_{CS2}$. The first current-sense element $R_{S1}$ senses the total LED current $I_{LED}$ of the LED current $I_{D2}$ (first LED segment current) and the LED current $I_{D4}$ (second LED segment current) flowing through the second LED segment 35 for generating the first current-sense signal $V_{CS1}$.

The LED currents $I_{D2}$ and $I_{D4}$ and the input current $I_{IN}$ can be expressed as:

$$I_{D2} = \frac{V_2 - V_{4B}}{R_{S2}} \quad (4)$$

$$I_{D4} = \frac{V_{4B}}{R_{S1}} - \frac{V_2 - V_{4B}}{R_{S2}} \quad (5)$$

$$I_{IN} = \frac{V_{4B}}{R_{S1}} \quad (6)$$

The second reference signal $V_2$ is higher than the first reference signal $V_1$ and fourth reference signal $V_{4B}$, and the fourth reference signal $V_{4B}$ is higher than the third reference signal $V_{3B}$. Therefore the first current regulator and the third current regulator (upstream current regulator) are disabled when the second current regulator and the fourth current regulator (downstream current regulator) regulate the LED current $I_{D2}$ and $I_{D4}$, respectively. That is, the LED driver doesn't need to have a control circuit to actively enable or disable the current regulator according to the present invention.

As shown in FIGS. 1B and 2C, the fold signal FOLD is disabled because the input voltage $V_{IN}$ is higher than the summation of the forward voltages $V_{F1}$, $V_{F2}$ and $V_{F3}$, but the input voltage $V_{IN}$ is lower than the summation of the forward voltages $V_{F1}$, $V_{F2}$, $V_{F3}$, and $V_{F4}$ ($V_{F1}+V_{F2}+V_{F3}<V_{IN}<V_{F1}+V_{F2}+V_{F3}+V_{F4}$). The input voltage $V_{IN}$ is higher than the threshold voltage $V_{TH}$. Therefore, the LED string 30 isn't divided into LED segments 31 and 35. Further, the switches 52 and 55 are switched for supplying the reference signal $V_{3A}$ and $V_{4A}$ to the operational amplifiers 51 and 54, respectively. The LEDs 32, 34, and 36 are driven by the input voltage $V_{IN}$. The third LED current $I_{D3}$ flows through the LEDs 32, 34, and 36. The first current-sense element $R_{S1}$ senses the total LED current $I_{LED}$ (the LED current $I_{D3}$) for generating the first current-sense signal $V_{CS1}$. The third LED current $I_{D3}$ and the input current $I_{IN}$ can be expressed as:

$$I_{IN} = I_{D3} = \frac{V_{3A}}{R_{S1}} \quad (7)$$

The third reference signal $V_{3A}$ is higher than the second reference signal $V_2$, and the second reference signal $V_2$ is higher than the first reference signal $V_1$. Therefore the first and second current regulators (upstream current regulators) are disabled when the third current regulator (downstream current regulator) regulate the LED current $I_{D3}$.

As shown in FIGS. 1B and 2D, the fold signal FOLD is also disabled because the input voltage $V_{IN}$ is higher than the summation of the forward voltages $V_{F1}$, $V_{F2}$, $V_{F3}$, and $V_{F4}$, that the input voltage $V_{IN}$ is higher than the threshold voltage $V_{TH}$. Therefore, the LED string 30 isn't divided into LED segments 31 and 35. The LEDs 32, 34, 36, and 38 are driven by the input voltage $V_{IN}$. The fourth LED current $I_{D4}$ flows through the LEDs 32, 34, 36, and 38. The first current-sense element $R_{S1}$ senses the total LED current $I_{LED}$ (the LED current $I_{D4}$) for generating the first current-sense signal $V_{CS1}$. The fourth LED current $I_{D4}$ and the input current $I_{IN}$ can be expressed as:

$$I_{IN} = I_{D4} = \frac{V_{4A}}{R_{S1}} \qquad (8)$$

The fourth reference signal $V_{4A}$ is higher than the third reference signal $V_{3A}$. Therefore the first, second, and third current regulators (upstream current regulators) are disabled when the fourth current regulator (downstream current regulator) regulates the LED current $I_{D4}$. Accordingly, the reference signal of any current regulator (driving unit) is higher than or equal to the reference signal of the previous current regulator (driving unit).

Figure 3A:
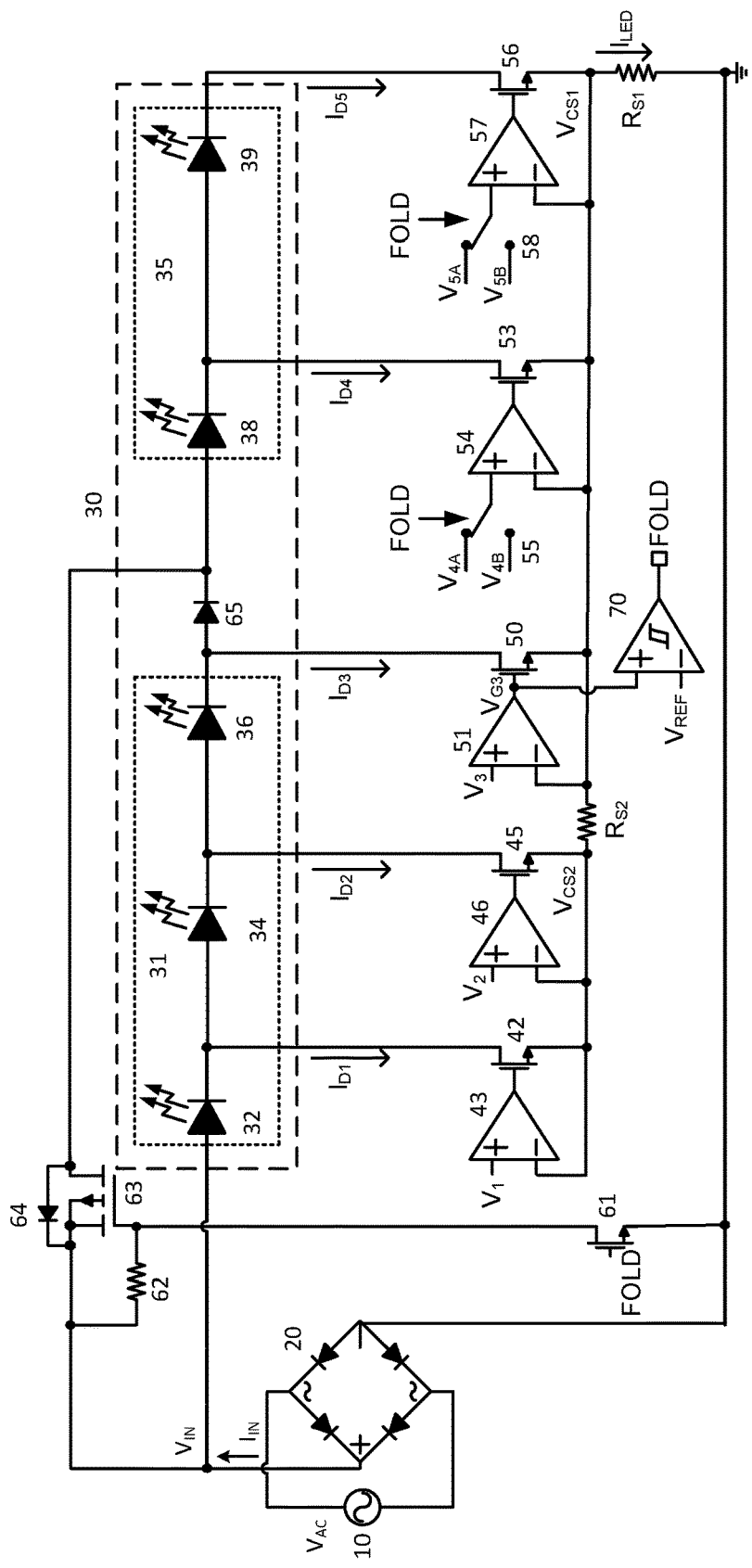
FIG. 3A shows a circuit diagram of the second embodiment of the LED driver applied to the LED system according to the present invention.

FIG. 3A shows a circuit diagram of the second embodiment of the LED driver applied to the LED system according to the present invention. As shown in FIG. 3A, the LED string 30 comprises five LEDs 32, 34, 36, 38, and 39, therefore the LED driver comprises five driving units. The third driving unit comprises the third transistor 50 and the third operational amplifier 51, and a third reference signal $V_3$ is supplied to the positive input terminal of the third operational amplifier 51. The fifth driving unit comprises a fifth transistor 56, a fifth operational amplifier 57, and a switch 58. The first terminal (drain terminal) of the fifth transistor 56 is coupled to the cathode of the LED 39. The second terminal (source terminal) of the fifth transistor 56 is coupled to the first terminal of the first current-sense element $R_{S1}$. The negative input terminal of the fifth operational amplifier 57 is coupled to the second terminal of the second current-sense element $R_{S2}$ and the first terminal of the first current-sense element $R_{S1}$ to receive the first current-sense signal $V_{CS1}$. The first terminal of the switch 58 is coupled to the positive input terminal of the fifth operational amplifier 57.

A reference signal $V_{5A}$ is supplied to the second terminal of the switch 58, and a reference signal $V_{5B}$ is supplied to the third terminal of the switch 58. The reference signal $V_{5A}$ or $V_{5B}$ is supplied to the positive input terminal of the fifth operational amplifier 57 through the switch 58 as the fifth reference signal. The switch 58 is controlled by the fold signal FOLD. The output terminal of the fifth operational amplifier 57 is coupled to the gate terminal of the fifth transistor 56. The fifth operational amplifier 57 controls the fifth transistor 56 to regulate the fifth LED current $I_{D5}$ for driving the fifth LED 39 in response to the first current-sense signal $V_{CS1}$ and the reference signal $V_{5A}$ or $V_{5B}$.

If number of LEDs of the LED string 30 and the driving units is odd number (2n+1, where n is positive integer), the state of the fold signal FOLD can be decided by operation status of one of the driving units, instead of the voltage at the LED string 30, but the state of the fold signal FOLD can also be decided by the voltage at the LED string 30 in another embodiment. According to this embodiment, the comparator 70 is coupled to the third driving unit in the middle of the LED string 30 to detect the operation status of the third driving unit for detecting the input voltage $V_{IN}$.

The positive input terminal of the comparator 70 is coupled to the gate terminal of the third transistor 50, and a reference voltage $V_{REF}$ is supplied to the negative input terminal of the comparator 70. The fold signal FOLD is generated by the comparator 70 that compares the gate voltage $V_{G3}$ of the third driving unit with the reference voltage $V_{REF}$. Once the third driving unit regulates the third LED current $I_{D3}$, the gate voltage $V_{G3}$ is about the summation of the third reference signal $V_3$ and the threshold voltage of the third transistor 50. The gate voltage $V_{G3}$ is higher than the summation of the third reference signal $V_3$ and the threshold voltage of the third transistor 50 when the input voltage $V_{IN}$ is lower, that the third driving unit doesn't regulate the third LED current $I_{D3}$. The gate voltage $V_{G3}$ will be higher than the reference voltage $V_{REF}$, therefore the fold signal FOLD is enabled and then the LED string 30 is folded. Further, the switches 55 and 58 are switched for supplying the reference signal $V_{4B}$ and $V_{5B}$ to the operational amplifiers 54 and 57, respectively. The reference signal $V_{5B}$ is higher than the reference signal $V_{4B}$.

Figure 3B:
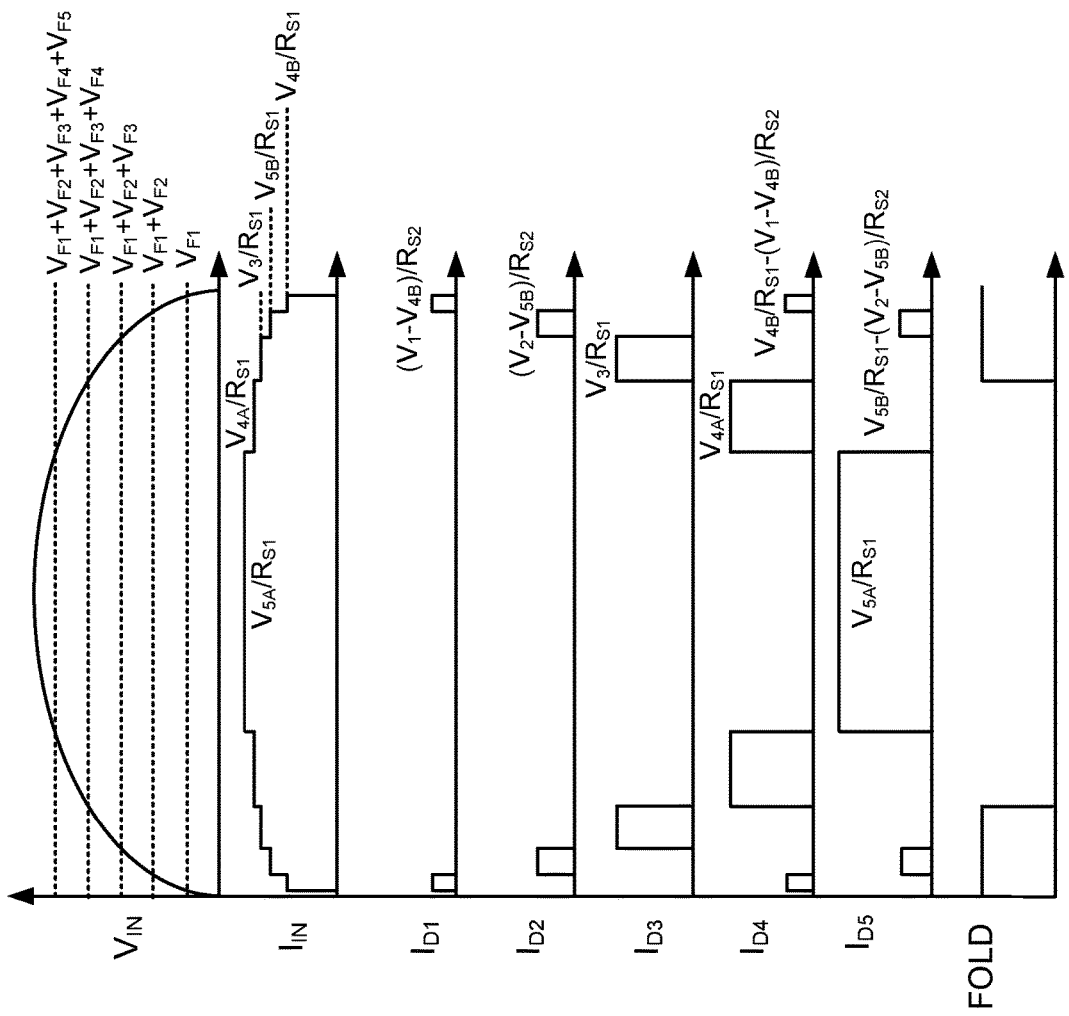
FIG. 3B shows waveforms of the second embodiment of the LED system according to the present invention.
Figures 4A, 4B:
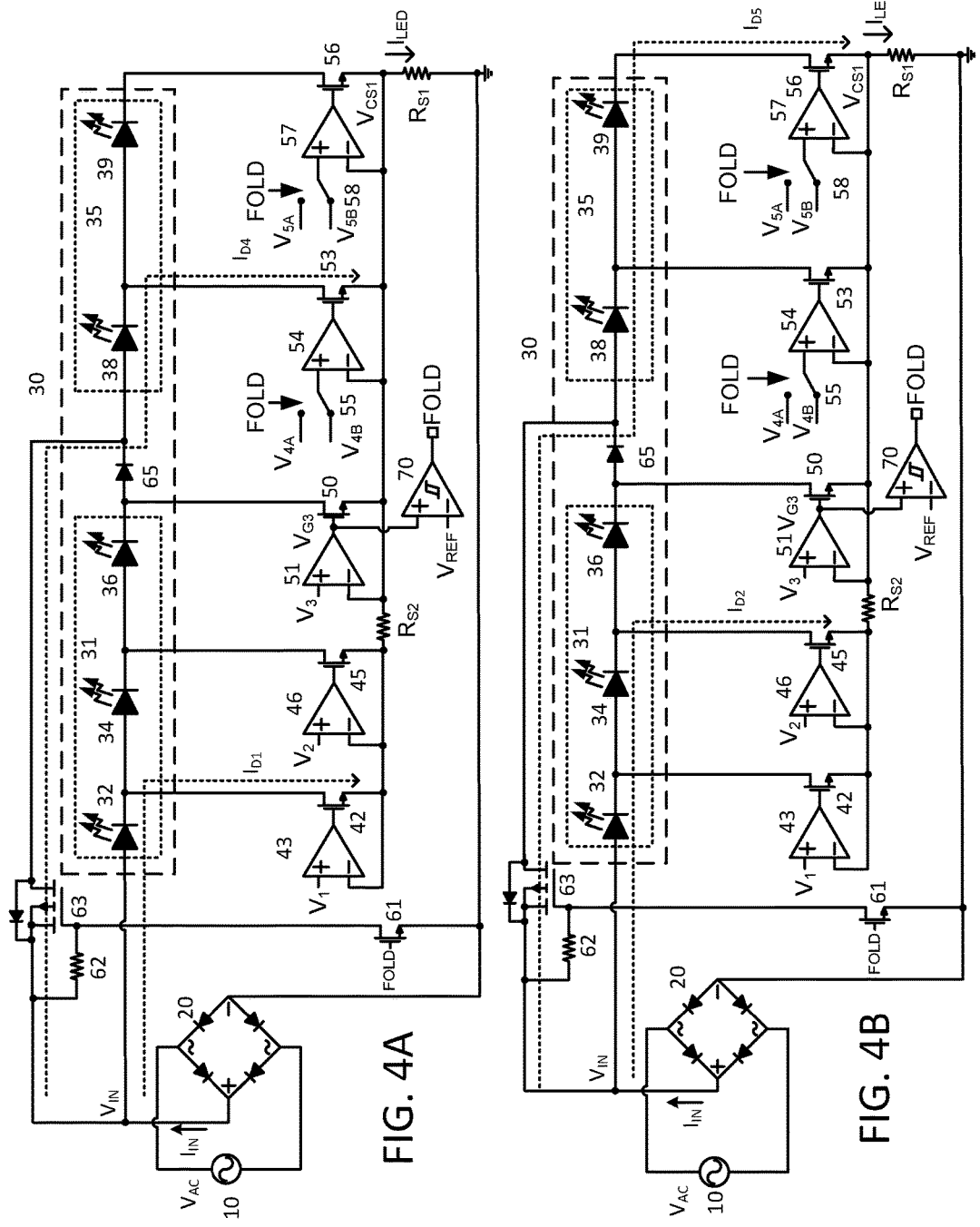
FIGS. 4A~4E show operation modes of the second embodiment of the LED system according to the present invention.

FIG. 3B shows waveforms of the second embodiment of the LED system according to the present invention. FIGS. 4A~4E show operation modes of the second embodiment of the LED system according to the present invention. As shown in FIG. 3B, the input voltage $V_{IN}$ is shown with respect to the forward voltages $V_{F1}$, $V_{F2}$, $V_{F3}$, $V_{F4}$, and $V_{F5}$ of the LEDs 32, 34, 36, 38, and 39 respectively. The forward voltage $V_{F1}$ is equal to the forward voltage $V_{F4}$, and the forward voltage $V_{F2}$ is equal to the forward voltage $V_{F5}$. As shown in FIGS. 3B and 4A, when the input voltage $V_{IN}$ is higher than the forward voltage $V_{F1}$ and lower than the summation of the forward voltages $V_{F1}$ and $V_{F2}$ ($V_{F1} < V_{IN} < V_{F1} + V_{F2}$), that the input voltage $V_{IN}$ is lower than the threshold voltage, the third driving unit doesn't regulate the third LED current $I_{D3}$. Therefore, the gate voltage $V_{G3}$ is higher than the reference voltage $V_{REF}$ and the fold signal FOLD is enabled. The LED string 30 is divided into the LED segments 31 and 35, and the LED segments 31 and 35 are coupled to each other in parallel. Accordingly, the LEDs 32 and 38 are driven by the input voltage $V_{IN}$. The LED currents $I_{D1}$ and $I_{D4}$ flow through the LEDs 32 and 38, respectively. The LED currents $I_{D1}$ and $I_{D4}$ and the input current $I_{IN}$ can be expressed as:

$$I_{D1} = \frac{V_1 - V_{4B}}{R_{S2}} \qquad (9)$$

$$I_{D4} = \frac{V_{4B}}{R_{S1}} - \frac{V_1 - V_{4B}}{R_{S2}} \qquad (10)$$

$$I_{IN} = \frac{V_{4B}}{R_{S1}} \qquad (11)$$

As shown in FIGS. 3B and 4B, the fold signal FOLD is also enabled because the input voltage $V_{IN}$ is higher than the summation of the forward voltages $V_{F1}$ and $V_{F2}$, but the input voltage $V_{IN}$ is lower than the summation of the forward voltages $V_{F1}$, $V_{F2}$, and $V_{F3}$ ($V_{F1} + V_{F2} < V_{IN} < V_{F1} + V_{F2} + V_{F3}$). That is, the input voltage $V_{IN}$ is still lower than the threshold voltage, and the third driving unit doesn't regulate the third LED current $I_{D3}$. Therefore, the LED string 30 is kept to be divided into the LED segments 31 and 35 coupled to each other in parallel. The LEDs 32, 34, 38, and 39 are driven by the input voltage $V_{IN}$. The LED current $I_{D2}$ flows through the LEDs 32 and 34. The LED current $I_{D5}$ flows through the LEDs 38 and 39. The LED currents $I_{D2}$ and $I_{D5}$ and the input current $I_{IN}$ can be expressed as:

$$I_{D2} = \frac{V_2 - V_{5B}}{R_{S2}} \quad (12)$$

$$I_{D5} = \frac{V_{5B}}{R_{S1}} - \frac{V_2 - V_{5B}}{R_{S2}} \quad (13)$$

$$I_{IN} = \frac{V_{5B}}{R_{S1}} \quad (14)$$

Figure 4C:
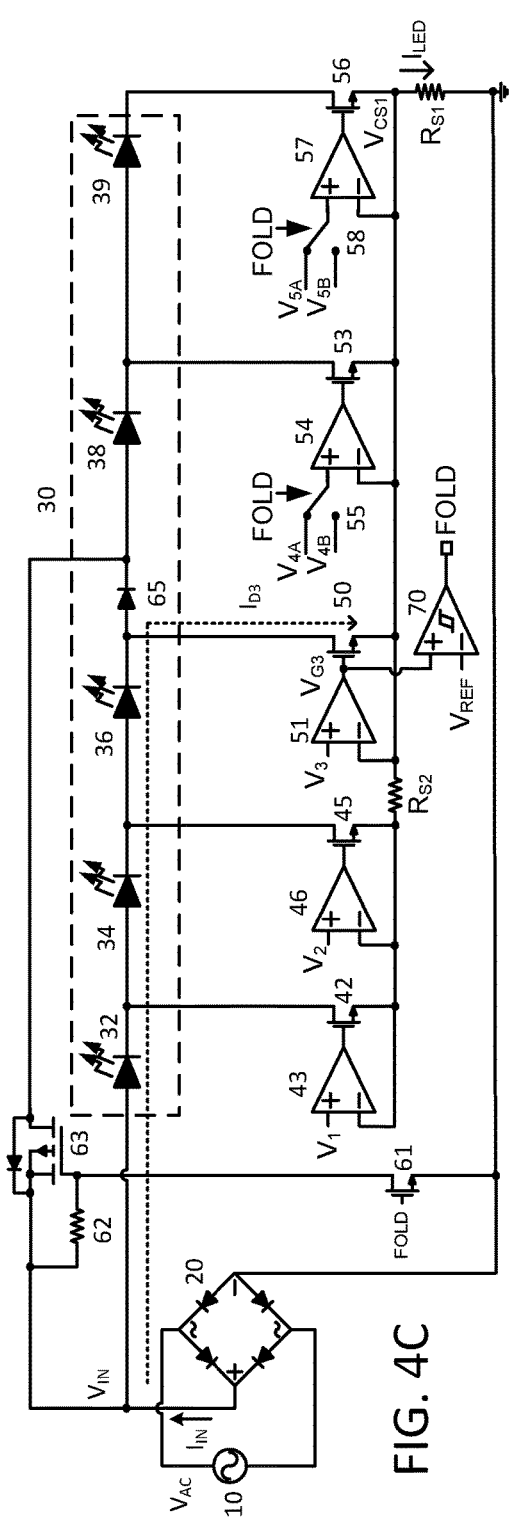

As shown in FIGS. 3B and 4C, The input voltage $V_{IN}$ is higher than the summation of the forward voltages $V_{F1}$, $V_{F2}$ and $V_{F3}$, but the input voltage $V_{IN}$ is lower than the summation of the forward voltages $V_{F1}$, $V_{F2}$, $V_{F3}$, and $V_{F4}$ ($V_{F1}+V_{F2}+V_{F3}<V_{IN}<V_{F1}+V_{F2}+V_{F3}+V_{F4}$). The input voltage $V_{IN}$ is higher than the threshold voltage. The third driving unit regulates the third LED current $I_{D3}$, and therefore the gate voltage $V_{G3}$ is lower than the reference voltage $V_{REF}$. The fold signal FOLD is disabled and the LED string 30 isn't divided into the LED segments 31 and 35. Further, the switch 55 and 58 are switched for supplying the reference signal $V_{4A}$ and $V_{5A}$ to the operational amplifiers 54 and 57, respectively. The fourth reference signal $V_{4A}$ is higher than the third reference signal $V_3$, and the fifth reference signal $V_{5A}$ is higher than the fourth reference signal $V_{4A}$. The LEDs 32, 34, and 36 are driven by the input voltage $V_{IN}$. The third LED current $I_{D3}$ flows through the LEDs 32, 34, and 36. The third LED current $I_{D3}$ and the input current $I_{IN}$ can be expressed as:

$$I_{IN} = I_{D3} = \frac{V_3}{R_{S1}} \quad (15)$$

Figure 4D:
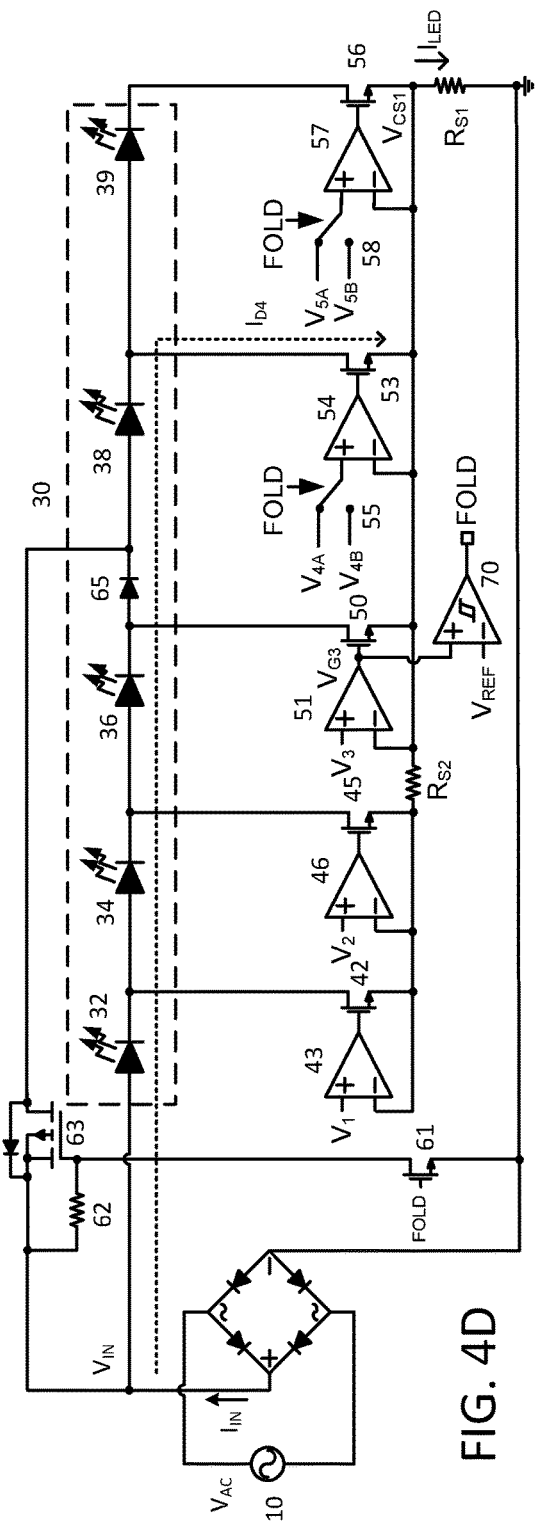

As shown in FIGS. 3B and 4D, the input voltage $V_{IN}$ is higher than the summation of the forward voltages $V_{F1}$, $V_{F2}$, $V_{F3}$ and $V_{F4}$, but the input voltage $V_{IN}$ is lower than the summation of the forward voltages $V_{F1}$, $V_{F2}$, $V_{F3}$, $V_{F4}$ and $V_{F5}$ ($V_{F1}+V_{F2}+V_{F3}+V_{F4}<V_{IN}<V_{F1}+V_{F2}+V_{F3}+V_{F4}+V_{F5}$). The input voltage $V_{IN}$ is higher than the threshold voltage. The gate voltage $V_{G3}$ is lower than the reference voltage $V_{REF}$ due to the fourth reference signal $V_{4A}$ is higher than the third reference signal $V_3$. Therefore, the fold signal FOLD is disabled, and the LED string 30 isn't divided into the LED segments 31 and 35. The LEDs 32, 34, 36, and 38 are driven by the input voltage $V_{IN}$. The fourth LED current $I_{D4}$ flows through the LEDs 32, 34, 36, and 38. The fourth LED current $I_{D4}$ and the input current $I_{IN}$ can be expressed as:

$$I_{IN} = I_{D4} = \frac{V_{4A}}{R_{S1}} \quad (16)$$

Figure 4E:
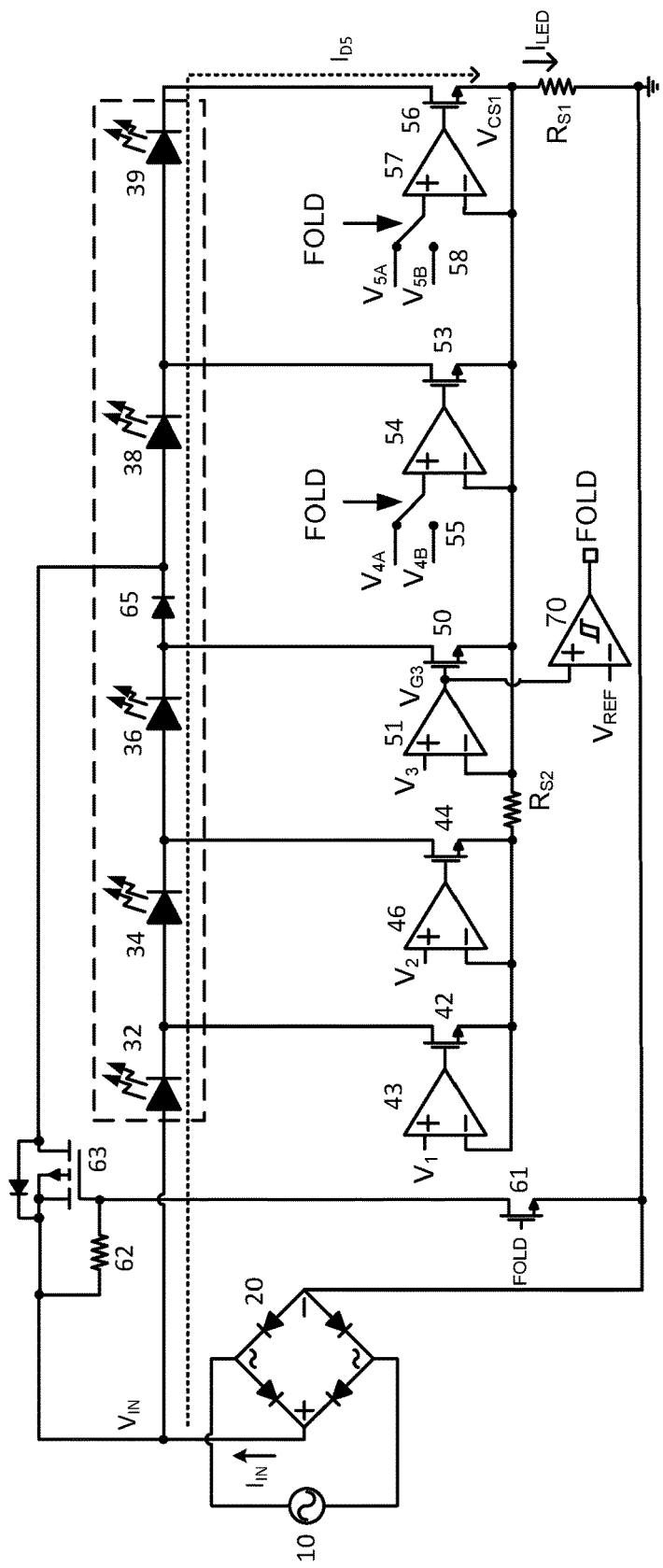

As shown in FIGS. 3B and 4E, the input voltage $V_{IN}$ is higher than the summation of the forward voltages $V_{F1}$, $V_{F2}$, $V_{F3}$, $V_{F4}$, and $V_{F5}$ ($V_{F1}+V_{F2}+V_{F3}+V_{F4}+V_{F5}<V_{IN}$). The input voltage $V_{IN}$ is higher than the threshold voltage. The gate voltage $V_{G3}$ is lower than the reference voltage $V_{REF}$ due to the fifth reference signal $V_{5A}$ is higher than the third reference signal $V_3$. Therefore, the fold signal FOLD is disabled, and the LED string 30 isn't divided into the LED segments 31 and 35. The LEDs 32, 34, 36, 38, and 39 are driven by the input voltage $V_{IN}$. The fifth LED current $I_{D5}$ flows through the LEDs 32, 34, 36, 38, and 39. The fifth LED current $I_{D5}$ and the input current $I_{IN}$ can be expressed as:

$$I_{IN} = I_{D5} = \frac{V_{5A}}{R_{S1}} \quad (17)$$

Figure 5:
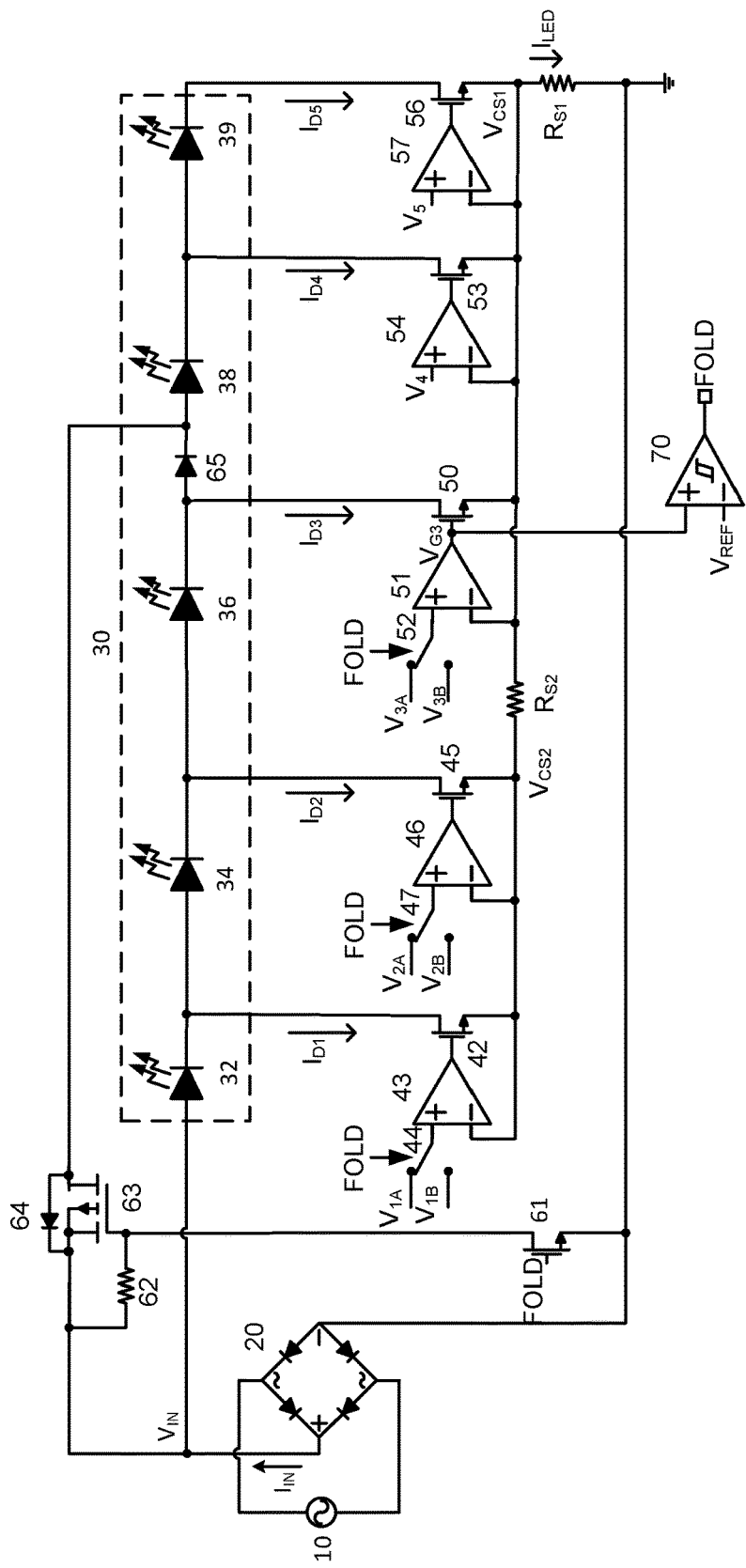
FIG. 5 shows a circuit diagram of the third embodiment of the LED driver applied to the LED system according to the present invention.

FIG. 5 shows a circuit diagram of the third embodiment of the LED driver applied to the LED system according to the present invention. As shown in FIG. 5, each of the driving units upstream to the dividing point includes a switch for adjusting its reference signal instead of adjusting the reference signals of the driving units downstream to the dividing point. The result is the input current shape which is like a constant current. It is better for flicker index and working with the dimmer.

The switch 44 of the first driving unit is coupled to the positive input terminal of the first operational amplifier 43. The reference signal $V_{1A}$ or $V_{1B}$ is supplied to the first operational amplifier 43 through the switch 44. The switch 47 of the second driving unit is coupled to the positive input terminal of the second operational amplifier 46. The reference signal $V_{2A}$ or $V_{2B}$ is supplied to the second operational amplifier 46 through the switch 47. The switch 52 of the third driving unit is coupled to the positive input terminal of the third operational amplifier 51. The reference signal $V_{3A}$ or $V_{3B}$ is supplied to the third operational amplifier 51 through the switch 52. The switches 44, 47, and 52 are controlled by the fold signal FOLD.

Figure 6A:
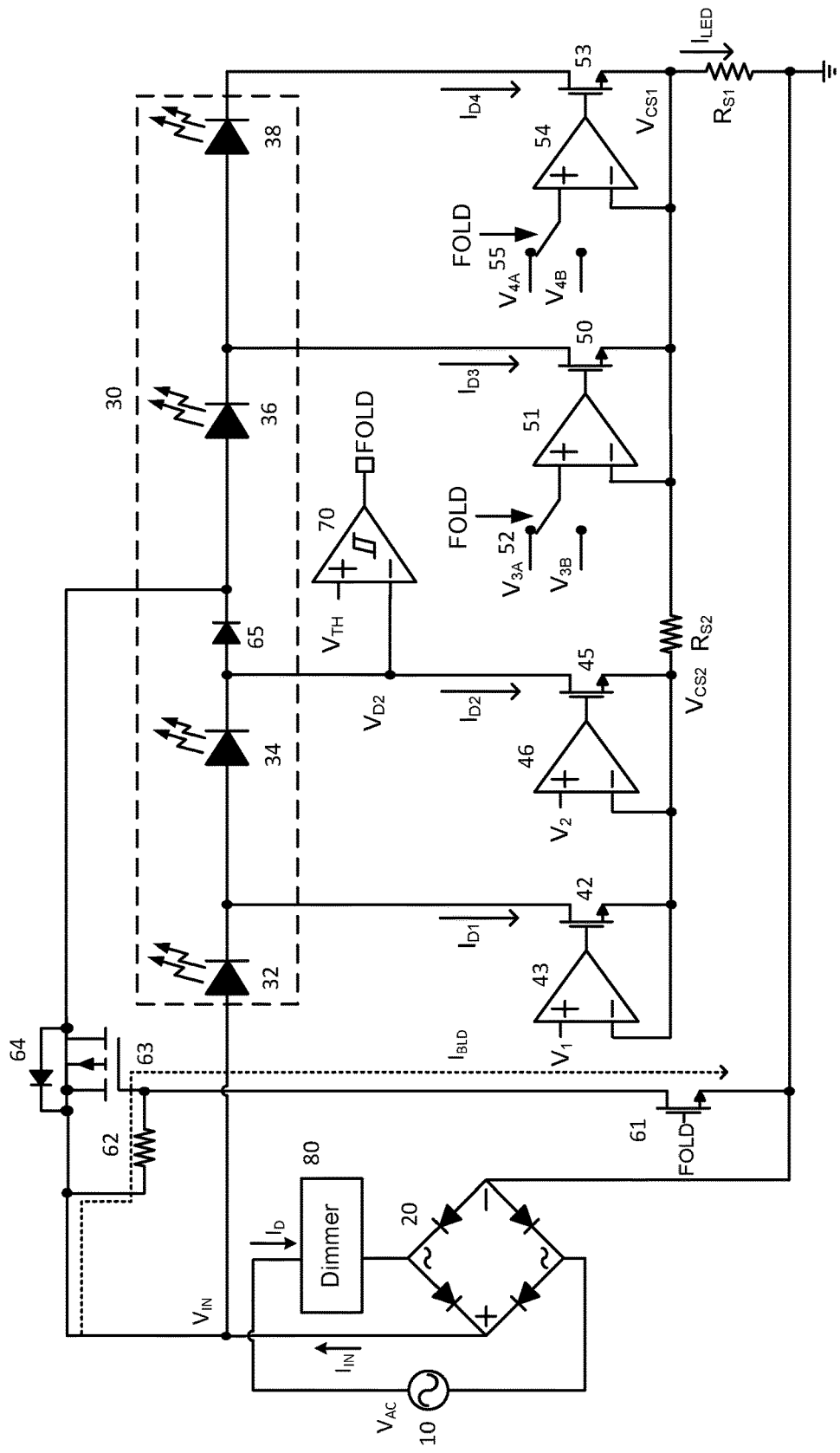
FIG. 6A shows a circuit diagram of the fourth embodiment of the LED driver applied to the LED system according to the present invention.

FIG. 6A shows a circuit diagram of the fourth embodiment of the LED driver applied to the LED system according to the present invention. As shown in FIG. 6A, the LED system further comprises a dimmer 80. The dimmer 80 is coupled between the AC power source 10 and the bridge rectifier 20. The AC power source 10 supplies the AC power $V_{AC}$ to the bridge rectifier 20 through the dimmer 80. The bridge rectifier 20 rectifies the AC power for providing the input power to the LED string 30. The input power supplies the input voltage $V_{IN}$ and the input current $I_{IN}$. The dimmer 80 may be a TRIAC dimmer according to one embodiment of the present invention.

Figure 6B:
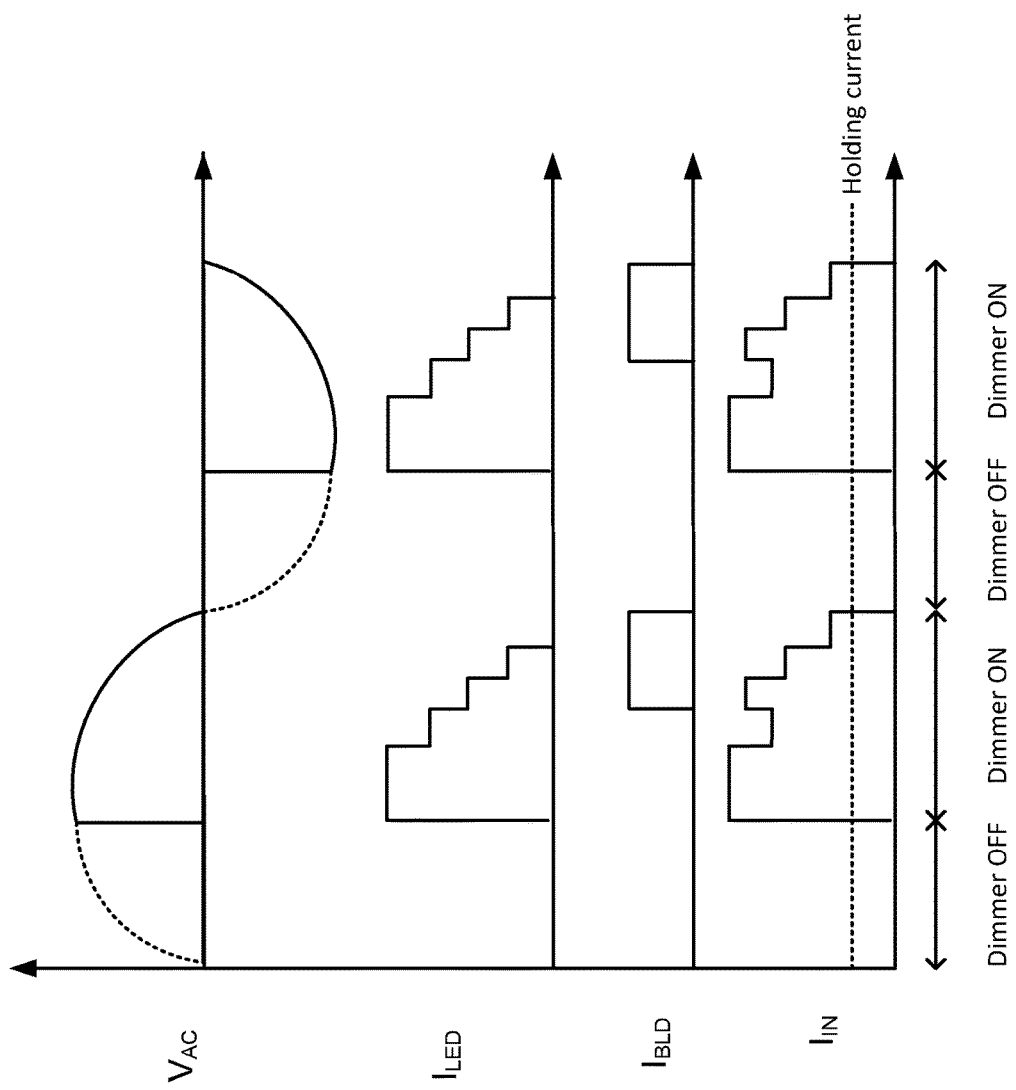
FIG. 6B shows waveforms of the fourth embodiment of the LED system according to the present invention.

The control transistor 61 is coupled to the switch 63. The control transistor 61 is further coupled to the bridge rectifier 20 through the resistor 62. The control transistor 61 controls the switch 63 to fold the LED string 30 when the input voltage $V_{IN}$ is lower than the threshold voltage. When the control transistor 61 is turned on by the fold signal FOLD to fold the LED sting 30, the control transistor 61 can be operated as a current sink circuit for sinking a bleeding current $I_{BLD}$ from the input power, that may be used to keep the current $I_D$ flowing through the dimmer 80 higher than the holding current for maintaining the dimmer 80 in conduction state. As shown in FIG. 6B, when the fold signal FOLD is enabled, the current sink circuit (control transistor 61) will sink the bleeding current $I_{BLD}$ from the input power for keeping the input current $I_{IN}$ higher than the holding current, that the current $I_D$ flowing through the dimmer 80 is kept higher than the holding current. Thus, the dimmer 80 is kept in conduction state. The input current $I_{IN}$ can be expressed as:

$$I_{IN} = I_{LED} + I_{BLD} \quad (18)$$

Figure 7A:
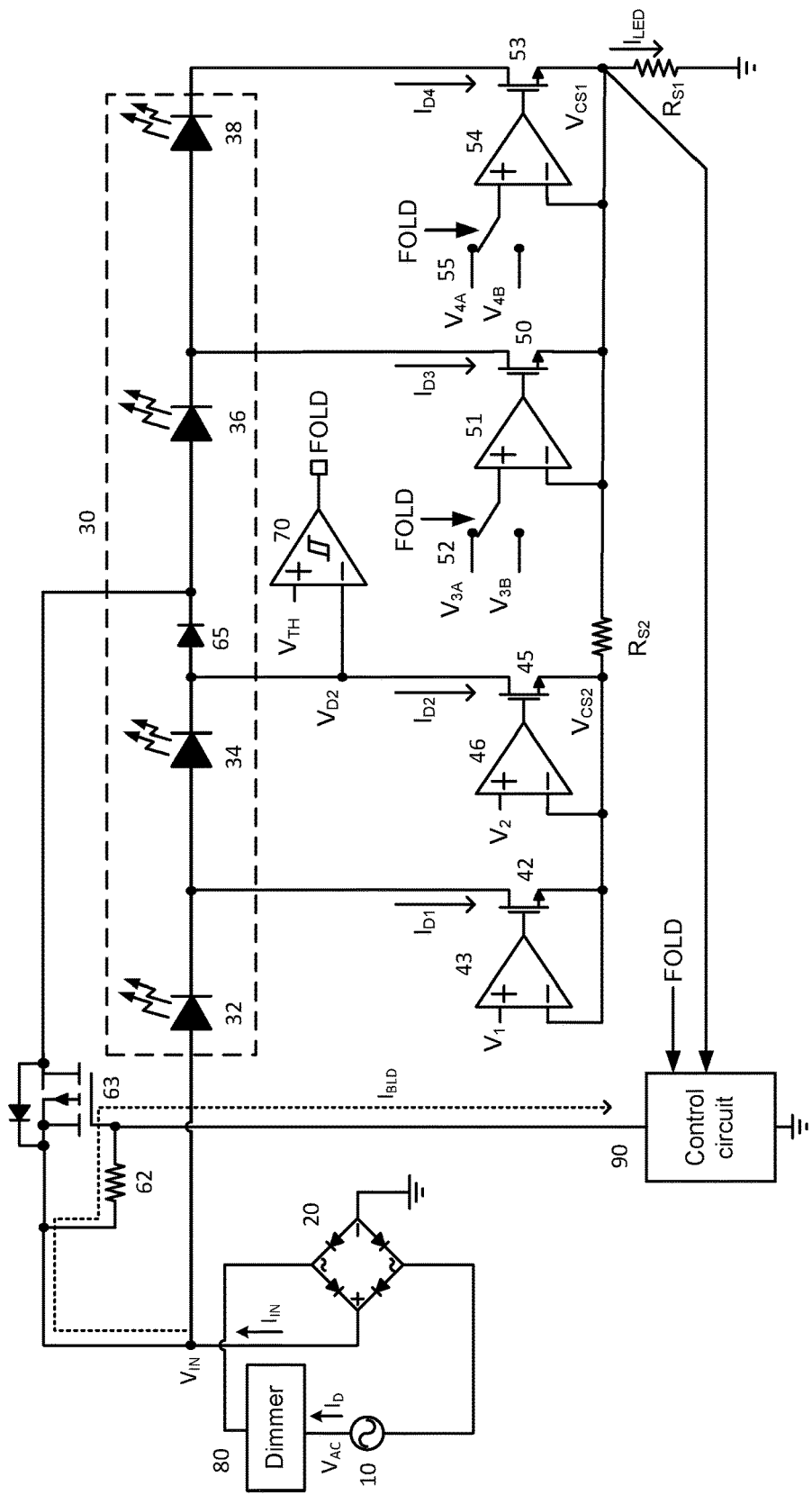
FIG. 7A shows a circuit diagram of the fifth embodiment of the LED driver applied to the LED system according to the present invention.
Figure 7B:
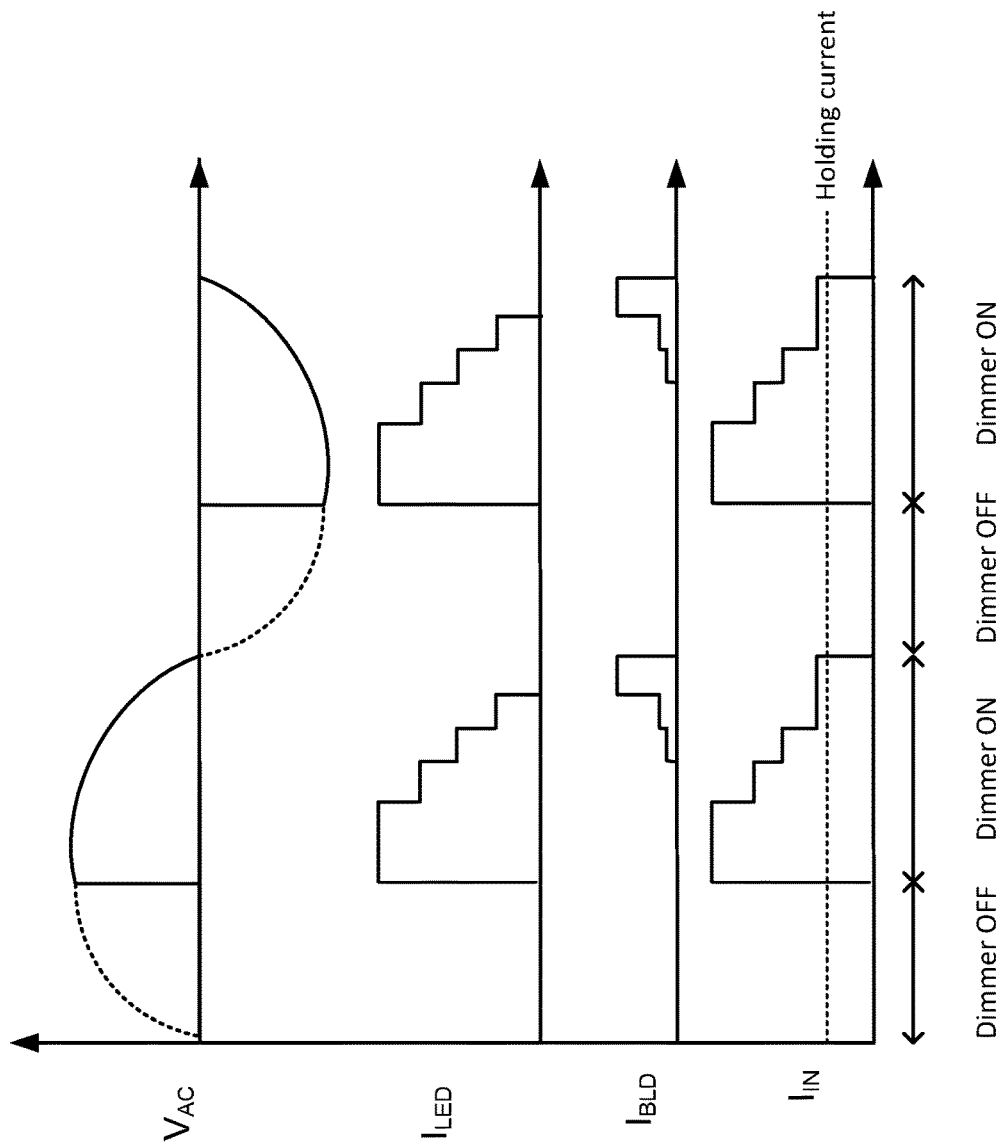
FIG. 7B shows waveforms of the fifth embodiment of the LED system according to the present invention.

FIG. 7A shows a circuit diagram of the fifth embodiment of the LED driver applied to the LED system according to the present invention. As shown in FIG. 7A, a control circuit 90 is coupled to the switch 63 to control the switch 63 for folding the LED string 30. The control circuit 90 is further coupled to the bridge rectifier 20 through the resistor 62, and coupled to the first terminal of the first current-sense element $R_{S1}$ to receive the first current-sense signal $V_{CS1}$. The control circuit 90 sinks the bleeding current $I_{BLD}$ from the input power in accordance with the first current-sense signal $V_{CS1}$ for keeping the current $I_D$ flowing through the dimmer 80 higher than the holding current. As shown in FIG. 7B, the bleeding current $I_{BLD}$ is lower when the total LED current $I_{LED}$ is higher. The minimum bleeding current $I_{BLD}$ is used to keep the switch 63 in turning on state. Once the total LED current $I_{LED}$ is decreased, the bleeding current $I_{BLD}$ is increased. Accordingly, the bleeding current $I_{BLD}$ can be regulated in response to the total LED current $I_{LED}$, and therefore the minimum non-zero input current $I_{IN}$ (current $I_D$) can be regulated right above the holding current to keep the dimmer 80 in conduction state.

Figure 8:
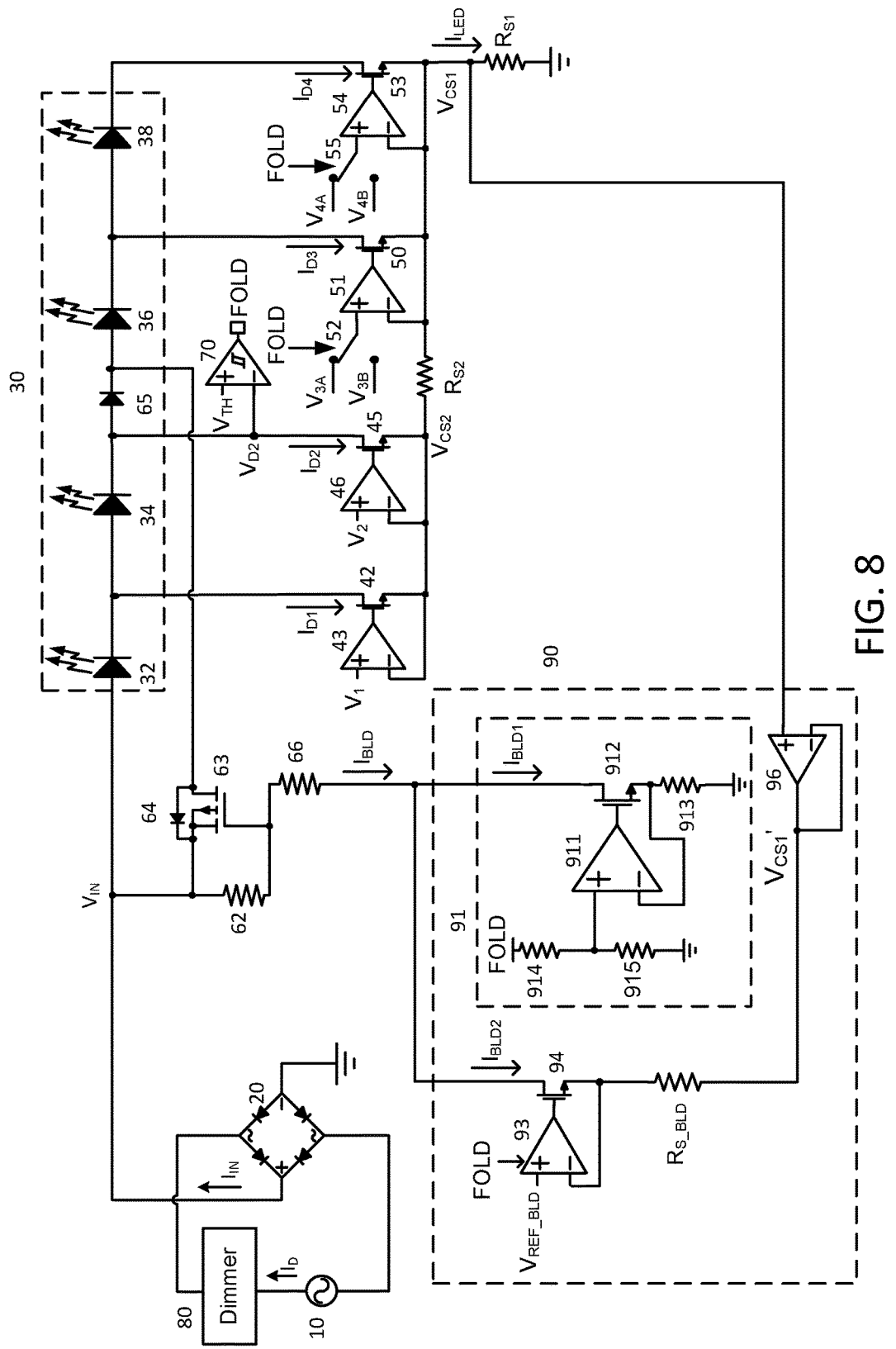
FIG. 8 shows a circuit diagram of the sixth embodiment of the LED driver applied to the LED system according to the present invention.

FIG. 8 shows a circuit diagram of the sixth embodiment of the LED driver applied to the LED system according to the present invention. As shown in FIG. 8, the control circuit 90 comprises a current sink circuit 91 and a bleeder circuit, The current sink circuit 91 is used to sink a first bleeding current $I_{BLD1}$ (the minimum non-zero bleeding current) to turn on the switch 63 for folding the LED string 30 in response to the fold signal FOLD. The bleeder circuit comprises a current sink circuit and a buffer 96 for sinking a second bleeding current $I_{BLD2}$ from the input power in accordance with the first current-sense signal $V_{CS1}$ for increasing the current $I_D$ flowing through the dimmer 80. The bleeding current $I_{BLD}$ can be expressed as:

$$I_{BLD} = I_{BLD1} + I_{BLD2} \qquad (19)$$

The current sink circuit 91 may be implemented by a voltage-to-current convertor according to one embodiment of the present invention. The current sink circuit 91 comprises an operational amplifier 911, a transistor 912, a resistor 913, and a voltage divider including two resistors 914 and 915. The first terminal (drain terminal) of the transistor 912 is coupled to the gate terminal of the switch 63 through a resistor 66. The first terminal of the transistor 912 is further coupled to the output terminal of the bridge rectifier 20 through the resistors 62 and 66 to receive the input power. The second terminal (source terminal) of the transistor 912 is coupled to the negative input terminal of the operational amplifier 911 and the first terminal of the resistor 913. The second terminal of the resistor 913 is coupled to the ground. The resistors 914 and 915 are coupled to each other in series. The fold signal FOLD is supplied to the resistor 914. The conjunction point of the resistors 914 and 915 is coupled to the positive input terminal of the operational amplifier 911. The divided fold signal FOLD is supplied to the positive input terminal of the operational amplifier 911. The output terminal of the operational amplifier 911 is coupled to the gate terminal of the transistor 912.

The current sink circuit of the bleeder circuit may be implemented also by the voltage-to-current convertor according to one embodiment of the present invention. The current sink circuit of the bleeder circuit comprises an operational amplifier 93, a transistor 94, and a resistor $R_{S\_BLD}$. The first terminal (drain terminal) of the transistor 94 is coupled to the output terminal of the bridge rectifier 20 through the resistors 62 and 66 to receive the input power, and the second terminal (source terminal) of the transistor 94 is coupled to the negative input terminal of the operational amplifier 93 and the first terminal of the resistor $R_{S\_BLD}$. A bleeding reference signal $V_{REF\_BLD}$ is supplied to the positive input terminal of the operational amplifier 93. The output terminal of the operational amplifier 93 is coupled to the gate terminal of the transistor 94. The fold signal FOLD is further supplied to the operational amplifier 93. The second terminal of the resistor $R_{S\_BLD}$ is coupled to the output terminal of the buffer 96. The positive input terminal of the buffer 96 is coupled to the first current-sense element $R_{S1}$ to receive the first current-sense signal $V_{CS1}$. The negative input terminal of the buffer 96 is coupled to the output terminal of the buffer 96. The buffer 96 is used for buffering the first current-sense signal $V_{CS1}$ and generating a buffering signal $V_{CS1}'$. The buffer 96 is an unity gain buffer according to one embodiment of the present invention.

The current sink circuit of the bleeder circuit is coupled to the input power and the output (buffering signal $V_{CS1}'$) of the buffer 96 for sinking the second bleeding current $I_{BLD2}$ from the input power in accordance with the first current-sense signal $V_{CS1}$ and the bleeding reference signal $V_{REF\_BLD}$. The second bleeding current $I_{BLD2}$ can be expressed as:

$$I_{BLD2} = \frac{V_{REF\_BLD} - V_{CS1}'}{R_{S\_BLD}} = \frac{V_{REF\_BLD} - I_{LED} \times R_{S1}}{R_{S\_BLD}} \qquad (20)$$

According to the equation (20), the second bleeding current $I_{BLD2}$ is adjusted according to the first current-sense signal $V_{CS1}$ due to the buffering signal $V_{CS1}'$ is correlated to the first current-sense signal $V_{CS1}$. When the total LED current $I_{LED}$ is lower, the buffering signal $V_{CS1}'$ is also lower. Therefore, the second bleeding current $I_{BLD2}$ will be increased to keep the current $I_D$ flowing through the dimmer 80 higher than the holding current. When the total LED current $I_{LED}$ becomes higher, the second bleeding current $I_{BLD2}$ will be decreased. Once the total LED current $I_{LED1}$ is higher than the holding current, the second bleeding current $I_{BLD2}$ may be decreased to zero. Accordingly, the bleeder circuit acts as a current regulator, and the total LED current $I_{LED}$ doesn't flow through the bleeder circuit.

Figure 9:
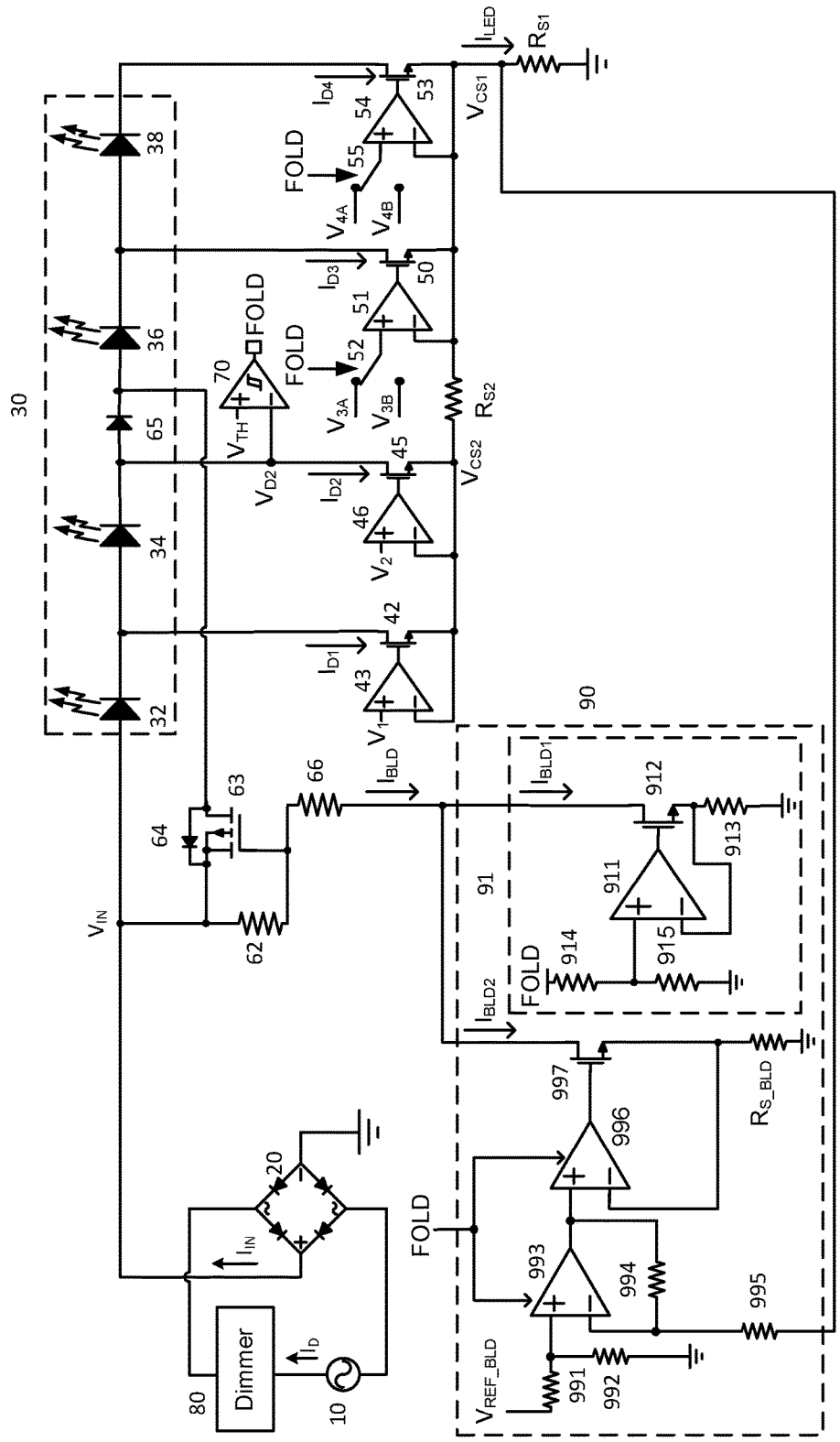
FIG. 9 shows a circuit diagram of the seventh embodiment of the LED driver applied to the LED system according to the present invention.

FIG. 9 shows a circuit diagram of the seventh embodiment of the LED driver applied to the LED system according to the present invention. As shown in FIG. 9, the bleeder circuit comprises resistors 991, 992, 994, 995, $R_{S\_BLD}$, operational amplifiers 993, 996, and a transistor 997 for sinking the second bleeding current $I_{BLD2}$ from the input power. The resistor 991 is coupled to the resistor 992 in series. The bleeding reference signal $V_{REF\_BLD}$ is supplied to the resistor 991. The positive input terminal of the operational amplifiers 993 is coupled to the conjunction point of the resistors 991 and 992. The resistor 994 is coupled between the negative input terminal and the output terminal of the operational amplifier 993. The resistor 995 is coupled between the negative input terminal of the operational amplifier 993 and the first terminal of the first current-sense element $R_{S1}$.

The positive input terminal of the operational amplifier 996 is coupled to the output terminal of the operational amplifier 993. The negative input terminal of the operational amplifier 996 is coupled to the second terminal (source terminal) of the transistor 997. The output terminal of the operational amplifier 996 is coupled to the gate terminal of the transistor 997. The first terminal (drain terminal) of the transistor 997 is coupled to the output terminal of the bridge rectifier 20 through the resistors 62 and 66 to receive the input power, and the second terminal (source terminal) of the transistor 997 is coupled to the first terminal of the resistor $R_{S\_BLD}$. The second terminal of the resistor $R_{S\_BLD}$ is coupled to the ground. The fold signal FOLD is further supplied to the operational amplifiers 993 and 996.

Figure 10:
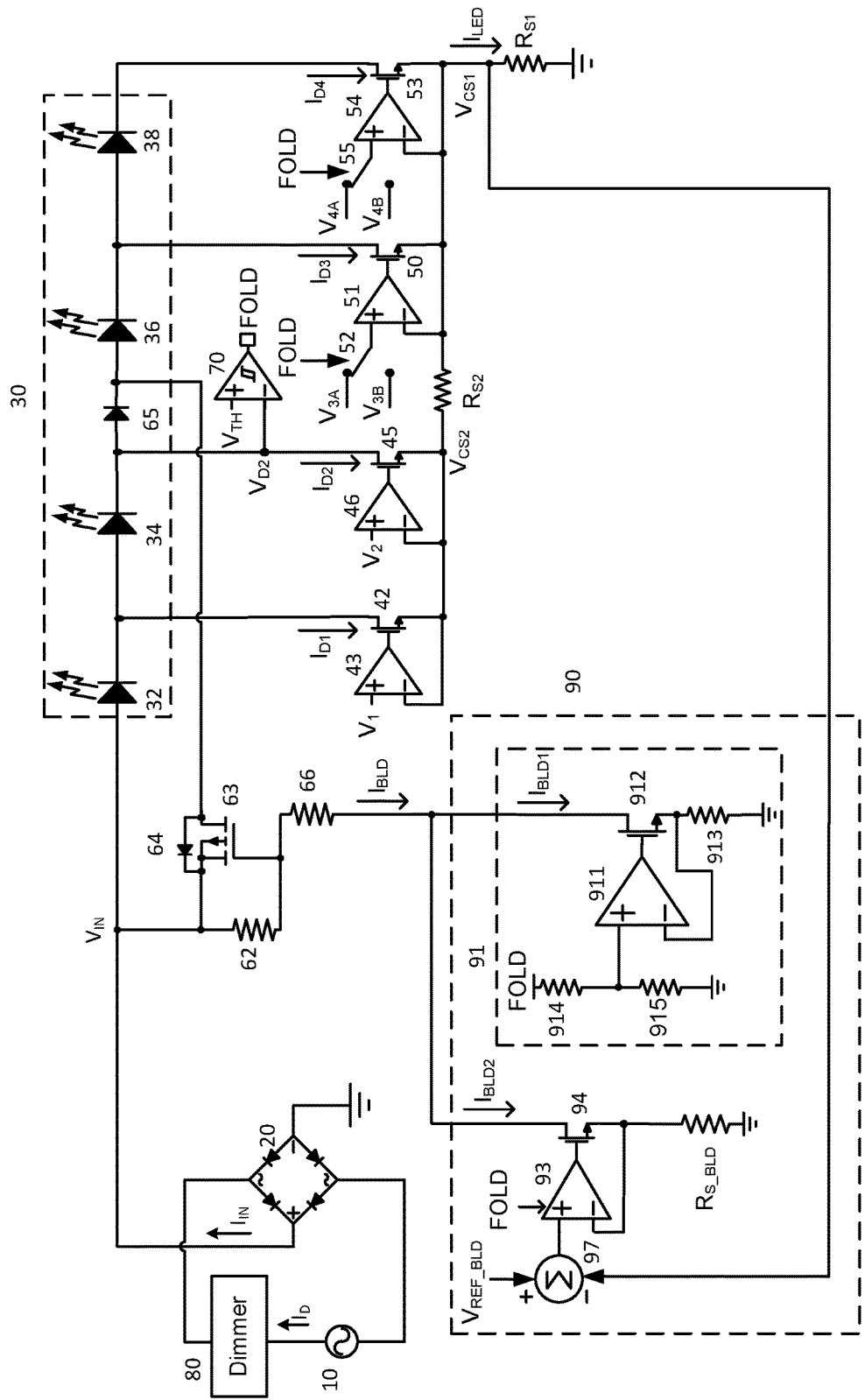
FIG. 10 shows a circuit diagram of the eighth embodiment of the LED driver applied to the LED system according to the present invention.

FIG. 10 shows a circuit diagram of the eighth embodiment of the LED driver applied to the LED system according to the present invention. As shown in FIG. 10, the bleeder circuit of this embodiment doesn't require the buffer 96 (as shown in FIG. 8). The bleeder circuit comprises the voltage-to-current convertor (current sink circuit) and an operation unit 97. The voltage-to-current convertor comprises the operational amplifier 93, the transistor 94, and the resistor $R_{S\_BLD}$.

The first terminal of the resistor $R_{S\_BLD}$ is coupled to the negative input terminal of the operational amplifier 93 and the second terminal (source terminal) of the transistor 94. The second terminal of the resistor $R_{S\_BLD}$ is coupled to the ground. The operation unit 97 is coupled to the first current-sense element $R_{S1}$ to receive the first current-sense signal $V_{CS1}$. The bleeding reference signal $V_{REF\_BLD}$ is supplied to the operation unit 97. The operation unit 97 generates an output signal in response to the first current-sense signal $V_{CS1}$ and the bleeding reference signal $V_{REF\_BLD}$. The operation unit 97 generates the output signal by subtracting the level of the first current-sense signal $V_{CS1}$ from the level of the bleeding reference signal $V_{REF\_BLD}$. The operation unit 97 serves as a subtractor. The output terminal of the operation unit 97 is coupled to the positive input terminal of the operational amplifier 93, and therefore the output signal of the operation unit 97 is supplied to the positive input terminal of the operational amplifier 93. Accordingly, the voltage-to-current converter of this embodiment sinks the second bleeding current $I_{BLD2}$ from the input power in accordance with the output signal of the operation unit 97.

The second bleeding current $I_{BLD2}$ can be expressed as:

$$I_{BLD2} = \frac{V_{REF\_BLD} - V_{CS1}}{R_{S\_BLD}} = \frac{V_{REF\_BLD} - I_{LED} \times R_{S1}}{R_{S\_BLD}} \quad (21)$$

According to the equation (21), the second bleeding current $I_{BLD2}$ is adjusted according to the first current-sense signal $V_{CS1}$. When the total LED current $I_{LED}$ is lower, the first current-sense signal $V_{CS1}$ is also lower, and therefore the output signal ($V_{REF\_BLD} - V_{CS1}$) is increased, that the second bleeding current $I_{BLD2}$ will be increased to keep the current $I_D$ flowing through the dimmer 80 higher than the holding current. When the total LED current $I_{LED}$ becomes higher, the output signal ($V_{REF\_BLD} - V_{CS1}$) is decreased. Therefore, the second bleeding current $I_{BLD2}$ will be decreased.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. An LED driver, comprising:
    a plurality of driving units, configured to be coupled to an LED string including a plurality of LEDs, the plurality of driving units for driving the plurality of LEDs;
    a fold circuit, configured to be coupled to the LED string, for dividing the LED string into a plurality of LED segments in response to an input voltage being lower than a threshold voltage and for coupling the LED segments to each other in parallel, and the input voltage is supplied to the LED segments; and
    a first driving unit of one of the plurality of LED segments having a selectable reference voltage that is selectable between a first reference voltage and a second reference voltage wherein the first reference voltage is less than the second reference voltage, the fold circuit configured to select the first reference voltage to the first driving unit in response to the input voltage being less than the threshold voltage and to select the second reference voltage to the first driving unit in response to the input voltage being no less than the threshold voltage.

2. The LED driver as claimed in claim 1, further comprising a detection circuit detecting the input voltage, and generating a fold signal when the input voltage is lower than the threshold voltage, wherein the fold circuit divides the LED string into the LED segments in response to the fold signal.

3. The LED driver as claimed in claim 2, wherein the detection circuit is coupled to the LED string to detect a voltage at the LED string for detecting the input voltage.

4. The LED driver as claimed in claim 3, wherein the detection circuit is coupled to the middle of the LED string for detecting the input voltage.

5. The LED driver as claimed in claim 2, wherein the driving units are coupled to the LEDs of the LED string respectively, the detection circuit is coupled to one of the driving units to detect the operation status of this driving unit for detecting the input voltage.

6. The LED driver as claimed in claim 1, wherein the driving units are coupled to the LEDs of the LED string respectively, the driving units are current regulators, each of the driving units has a reference signal for controlling an LED current, and the reference signal of any driving unit is higher than or equal to the reference signal of the previous driving unit when the input voltage is higher than the threshold voltage.

7. The LED driver as claimed in claim 1, wherein the driving units are coupled to the LEDs of the LED string respectively, the driving units are current regulators, each of the driving units has a reference signal for controlling an LED current; when the LED string is divided into the LED segments, the reference signal of any driving unit of each LED segment is higher than or equal to the reference signal of the previous driving unit of the same LED segment.

8. The LED driver as claimed in claim 1, wherein the driving units are coupled to the LEDs of the LED string respectively, the driving units are current regulators, each of the driving units has a reference signal for controlling an LED current; when the LED string is divided into the LED segments, the LED segments comprise a first LED segment upstream to the dividing point of the LED string and a second LED segment downstream to the dividing point; the reference signal of the driving unit corresponding to the Nth LED of the second LED segment is lower than the reference signal of the driving unit corresponding to the Nth LED of the first LED segment.

9. The LED driver as claimed in claim 1, wherein the LED segments comprise a first LED segment upstream to the dividing point of the LED string and a second LED segment downstream to the dividing point when the LED string is divided into the LED segments, in which the LED driver comprises a first current-sense element and a second current-sense element; the second current-sense element senses a first LED segment current flowing through the first LED segment, and the first current-sense element senses a total LED current of the first LED segment current and a second LED segment current flowing through the second LED segment.

10. The LED driver as claimed in claim 1, wherein a terminal of the LED string is coupled to an input power, and the fold circuit comprises:
   a switch, configured to be coupled between the dividing point of the LED string and the input power; and
   a control circuit, coupled to the switch, and turning on the switch for dividing the LED string into the LED segments when the input voltage is lower than the threshold voltage.

11. The LED driver as claimed in claim 10, wherein the control circuit comprises a current sink circuit coupled to the switch and for coupling to receive the input power, the current sink circuit turns on the switch and sinks a bleeding current from the input power when the input voltage is lower than the threshold voltage.

12. The LED driver as claimed in claim 1, wherein each driving unit comprises:
   a transistor, coupled between the LED and a ground; and
   an operational amplifier, controlling the transistor for driving the LED in response to a reference signal.

13. The LED driver as claimed in claim 1, further comprising a bleeder circuit coupled to an input power and sinking a bleeding current from the input power in accordance with a current-sense signal correlated to a total LED current for increasing a current flowing through a dimmer.

14. The LED driver as claimed in claim 13, wherein the bleeding current is increased when the total LED current is decreased.

15. The LED driver as claimed in claim 13, wherein the bleeder circuit comprises:
   a buffer, receiving the current-sense signal; and
   a current sink circuit, coupled to the input power and an output of the buffer for sinking the bleeding current from the input power in accordance with the current-sense signal and a bleeding reference signal.

16. The LED driver as claimed in claim 13, wherein the bleeder circuit comprises:
   an operation unit, generating an output signal in response to the current-sense signal and a bleeding reference signal; and
   a current sink circuit, coupled to the input power and the operation unit for sinking the bleeding current from the input power in accordance with the output signal of the operation unit.

17. The LED driver as claimed in claim 13, further comprising a current-sense element sensing the total LED current for generating the current-sense signal.

18. The LED driver as claimed in claim 1, wherein the input voltage is a rectified AC voltage.

* * * * *